US007890792B2

(12) United States Patent
Tameshige et al.

(10) Patent No.: US 7,890,792 B2
(45) Date of Patent: Feb. 15, 2011

(54) SERVER SWITCHING METHOD AND SERVER SYSTEM EQUIPPED THEREWITH

(75) Inventors: Takashi Tameshige, Tokyo (JP); Yoshifumi Takamoto, Kokubunji (JP); Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 401 days.

(21) Appl. No.: 12/073,264

(22) Filed: Mar. 3, 2008

(65) Prior Publication Data

US 2009/0138753 A1 May 28, 2009

(30) Foreign Application Priority Data

Nov. 22, 2007 (JP) ............................. 2007-302697

(51) Int. Cl.
*G06F 11/00* (2006.01)
(52) U.S. Cl. ........................................................ 714/3
(58) Field of Classification Search ................ 714/2–4, 714/6–13, 15, 16, 20, 21, 39, 47
See application file for complete search history.

(56) References Cited

U.S. PATENT DOCUMENTS

| 5,987,621 A * | 11/1999 | Duso et al. ...................... 714/4 |
| 6,408,399 B1 * | 6/2002 | Baughman ...................... 714/4 |
| 6,625,750 B1 * | 9/2003 | Duso et al. ..................... 714/11 |
| 7,287,186 B2 * | 10/2007 | McCrory et al. ............... 714/13 |
| 7,334,027 B2 * | 2/2008 | Nakajima et al. ............. 709/221 |
| 2003/0237018 A1 * | 12/2003 | Baba ............................. 714/4 |
| 2004/0139205 A1 * | 7/2004 | Ichikawa et al. ............. 709/229 |
| 2006/0253725 A1 * | 11/2006 | Chen et al. ..................... 714/4 |
| 2007/0174658 A1 * | 7/2007 | Takamoto et al. ............. 714/4 |
| 2007/0180314 A1 * | 8/2007 | Kawashima et al. .......... 714/15 |
| 2007/0220323 A1 * | 9/2007 | Nagata ......................... 714/13 |

FOREIGN PATENT DOCUMENTS

JP 2006-011781 1/2006

* cited by examiner

*Primary Examiner*—Nadeem Iqbal
(74) *Attorney, Agent, or Firm*—McDermott Will & Emery LLP

(57) ABSTRACT

There is disclosed a high speed switching method for a disk image delivery system fail-over. A management server sends a disk image of an active server in advance to a standby server. When receiving a report that the active server has failed, the management server judges whether or not it is possible for the standby server to perform the service of the failed active server based on service provision management server information held by the management server and if possible, instructs the standby server to perform the service of the active server. Even if the disk image delivered in advance is different from the disk image of the failed active server, switching of is the service to the standby server can be performed more quickly through resetting the setting values of unique information and installing the additional pieces of software on the standby server by the management server than redelivering an appropriate disk image.

3 Claims, 27 Drawing Sheets

FIG. 6

| SERVER ID | CPU ARCHI-TECTURE | UUID | HBA | | | NIC | | | STORAGE | | |
|---|---|---|---|---|---|---|---|---|---|---|---|
| | | | NUMBER | WWN | DEVICE DRIVER | NUMBER | MAC ADDRESS | DEVICE DRIVER | I/F | CAPACITY | TYPE |
| SERVER 1 | IA32 | UUID1 | 0 | ---- | ---- | 1 | MAC1 | N-DRIVER1 | IDE | 80GB | BOOT |
| SERVER 2 | IA32 | UUID2 | 0 | ---- | ---- | 1 | MAC2 | N-DRIVER2 | IDE | 80GB | BOOT |
| SERVER 3 | IA64 | UUID3 | 2 | WWN2 | H-DRIVER2 | 2 | MAC3 | N-DRIVER3 | SCSI | 20GB | BOOT |
| | | | | WWN3 | H-DRIVER2 | | MAC4 | N-DRIVER4 | SCSI | 250GB | DATA |
| ... | ... | ... | ... | ... | ... | ... | ... | ... | ... | ... | ... |

| | 701 | 702 | 703 | 704 | 705 | 706 | 707 | 708 | 709 | 710 | 711 |
|---|---|---|---|---|---|---|---|---|---|---|---|
| | SERVICE ID | DISK IMAGE NAME | OS TYPE | CPU ARCHI-TECTURE | HOST NAME | OS PASSWORD | IP INFOR-MATION | P.P. NAME | P.P. UNIQUE SETTING | COEXISTENCE CONDITIONS WITH OTHER P.P.S | DELIVERY COST |
| 751 | SERVICE A-1 | DISK IMAGE 11 | WIN 2003 | IA32 | HOST11 | PASSWORD 11 | IP111 | COSMI NEXUS | LOGICAL IP ADDRESS PORT NUMBER | "P.P."&& "VER.7-8" | 30MIN |
| 752 | SERVICE A-2 | DISK IMAGE 12 | WIN 2003 | IA32 | HOST12 | PASSWORD 12 | IP121 | COSMI NEXUS | LOGICAL IP ADDRESS PORT NUMBER | "JRE1.4.2" | 30MIN |
| | ... | ... | ... | ... | ... | ... | ... | ... | ... | ... | ... |
| 753 | SERVICE B-1 | DISK IMAGE 21 | LINUX 2.6.2 | IA64 | HOST21 | PASSWORD 21 | IP211 IP212 | HIRDB | NON-CLUSTERED SYSTEM PORT NUMBER | NO | 45MIN |
| 754 | SERVICE B-2 | DISK IMAGE 22 | LINUX 2.6.2 | IA64 | HOST22 | PASSWORD 22 | IP221 IP222 | HIRDB | NON-CLUSTERED SYSTEM PORT NUMBER | NO | 45MIN |
| | ... | ... | ... | ... | ... | ... | ... | ... | ... | ... | ... |
| 755 | SERVICE A | DISK IMAGE 10 | WIN 2003 | IA32 | ... | ... | ... | COSMI NEXUS | VIRTUAL IP ADDRESS PORT NUMBER | ... | 25MIN |
| 756 | SERVICE B | DISK IMAGE 20 | LINUX 2.6.2 | IA64 | ... | ... | ... | HIRDB | NON-CLUSTERED SYSTEM PORT NUMBER | ... | 25MIN |
| | ... | ... | ... | ... | ... | ... | ... | ... | ... | ... | ... |
| 757 | SERVICE -1 | DISK IMAGE 01 | WIN 2003 | IA32 | ... | ... | ... | ... | OS DELIVERY COST | ... | 15MIN |
| 578 | SERVICE -2 | DISK IMAGE 02 | LINUX 2.6.2 | IA64 | ... | ... | ... | ... | OS DELIVERY COST | ... | 15MIN |
| | ... | ... | ... | ... | ... | ... | ... | ... | ... | ... | ... |

FIG. 8

| 801 | 802 | 803 | 804 | HBA 805 | 806 | 807 | NIC 808 | 809 | STORAGE 810 | 811 |
|---|---|---|---|---|---|---|---|---|---|---|
| DISK IMAGE NAME | CPU ARCHI-TECTURE | UUID | NUMBER | WWN | DEVICE DRIVER | NUMBER | MAC ADDRESS | DEVICE DRIVER | I/F | CAPACITY |
| DISK IMAGE 11 | IA32 | UUID1 | 0 | ---- | ---- | 1 | MAC1 | N-DRIVER1 | IDE | 80GB |
| DISK IMAGE 21 | IA64 | UUID2 | 2 | WWN2 WWN3 | H-DRIVER2 H-DRIVER2 | 2 | MAC2 MAC3 | N-DRIVER2 N-DRIVER3 | SCSI SCSI | 20GB |
| ... | ... | ... | ... | ... | ... | ... | ... | ... | ... | ... |

FIG. 9

| SERVER ID (901) | ACTIVE/ SPARE (902) | SERVICE (903) | DISK IMAGE NAME (904) | DELIVERY STATUS (905) | FAILURE STATUS (906) | SERVICE STATUS (907) | COINCIDENCE RANGE (908) | DATA TAKEOVER (909) |
|---|---|---|---|---|---|---|---|---|
| SERVER 1 | ACTIVE | A-1 | DISK IMAGE 11 | ALREADY DELIVERED ALREADY SET | NO PROBLEM | SERVICED | P.P./OS ARCHITECTURE | ---- |
| SERVER 2 | ACTIVE | A-2 | DISK IMAGE 12 | ALREADY DELIVERED ALREADY SET | NO PROBLEM | SERVICED | P.P./OS ARCHITECTURE | ---- |
| SERVER 3 | ACTIVE | B-1 | DISK IMAGE 21 | ALREADY DELIVERED ALREADY SET | NO PROBLEM | SERVICED | DISK IMAGE | LU3 |
| SERVER 4 | SPARE | A | DISK IMAGE 10 | ALREADY DELIVERED NOT SET YET | ---- | STANDBY | ---- | ---- |
| ... | ... | ... | ... | ... | ... | ... | ... | ... |

| SERVER ID 1001 | ACTIVE/ SPARE 1002 | SERVICE 1003 | DISK IMAGE NAME 1004 | DELIVERY STATUS 1005 | FAILURE STATUS 1006 | SERVICE STATUS 1007 | COINCIDENCE RANGE 1008 | DATA TAKEOVER 1009 |
|---|---|---|---|---|---|---|---|---|
| SERVER 1 | ACTIVE | A-1 | DISK IMAGE 11 | ALREADY DELIVERED ALREADY SET | NO PROBLEM | SERVICED | P.P./OS ARCHITECTURE | ... |
| SERVER 2 | ACTIVE | A-2 | DISK IMAGE 12 | ALREADY DELIVERED ALREADY SET | NO PROBLEM | SERVICED | P.P./OS ARCHITECTURE | ... |
| SERVER 3 | ACTIVE | B-1 | DISK IMAGE 21 | ALREADY DELIVERED ALREADY SET | IN FAILURE | DOWN | DISK IMAGE | LU3 |
| SERVER 4 | STANDBY | B-1 | DISK IMAGE 21 | IN DELIVERY | B-1 BEING SWITCHED | IN FAIL-OVER | ... | ... |
| ... | ... | ... | ... | ... | ... | ... | ... | ... |

| SERVER ID 1101 | ACTIVE/ STANDBY 1102 | SERVICE 1103 | DISK IMAGE NAME 1104 | DELIVERY STATUS 1105 | FAILURE STATUS 1106 | SERVICE STATUS 1107 | COINCIDENCE RANGE 1108 | DATA TAKEOVER 1109 |
|---|---|---|---|---|---|---|---|---|
| SERVER 3 | ACTIVE | B-1 | DISK IMAGE 21 | --- | IN FAILURE | DOWN | DISK IMAGE | LU3 |
| SERVER 4 | STANDBY | B-1 | DISK IMAGE 21 | ALREADY DELIVERED ALREADY SET | B-1 BEING SWITCHED | SERVICED | --- | --- |
| ... | ... | ... | ... | ... | ... | ... | ... | ... |

| | SERVICE ID 1201 | VLAN ID 1202 | MAC ADDRESS 1203 | COMMUNICATION PROTOCOL 1204 | BRIDGE ID 1205 | PORT ID 1206 | IP INFORMATION 1207 |
|---|---|---|---|---|---|---|---|
| 1251 | SERVICE A-1 | VLAN0 | MAC111 | TCP | BRIDGE0 | PORT0 | IP111 |
| 1252 | SERVICE A-2 | VLAN0 | MAC121 | TCP | BRIDGE0 | PORT1 | IP121 |
| | ... | ... | ... | ... | ... | ... | ... |
| 1253 | SERVICE B-2 | VLAN1 | MAC211 | TCP | BRIDGE1 | PORT0 | IP211 |
| | | VLAN2 | MAC212 | HTTP | BRIDGE1 | PORT1 | IP212 |
| 1254 | SERVICE B-2 | VLAN1 | MAC221 | TCP | BRIDGE1 | PORT2 | IP221 |
| | | VLAN2 | MAC222 | HTTP | BRIDGE2 | PORT0 | IP222 |
| | ... | ... | ... | ... | ... | ... | ... |
| 1255 | SERVICE A | VLAN0 | | TCP | BRIDGE0 | PORT0-PORT1022 | |
| 1256 | SERVICE B | VLAN1 | | TCP | BRIDGE1 | PORT0-port511 | |
| | | VLAN2 | | HTTP | BRIDGE1 | PORT512-PORT1022 | |
| | | | | | BRIDGE2 | PORT0-PORT1022 | |
| | ... | ... | ... | ... | ... | ... | ... |
| 1257 | SPARE | VLAN10 | | | BRIDGE10 | PORT0-PORT1022 | IP0-IP100 |

FIG.13

| | SERVICE ID | PRIORITY INITIAL VALUE | PRIORITY |
|---|---|---|---|
| 1301 | | 1302 | 1303 |
| 1351 | SERVICE A-1 | 1 | 10 |
| 1352 | SERVICE A-2 | 3 | 2 |
| | ⋮ | ⋮ | ⋮ |
| 1353 | SERVICE B-1 | 2 | 1 |
| 1354 | SERVICE B-2 | 4 | 3 |
| | ⋮ | ⋮ | ⋮ |

FIG.14

| | NOTIFICATION ID | FAILURE INFORMATION | PRIORITY |
|---|---|---|---|
| | 1401 | 1402 | 1403 |
| 1451 | NOTIFICATION 1 | POWER FAILURE<br>NORMAL:V[0]=5.2V~5.5V,<br>V[1]=-0.01V~0.01V | HIGH/ONCE |
| 1452 | NOTIFICATION 2 | TEMPERATURE ANOMALY<br>NORMAL:T[0]=-240K~330K | LOW/THREE TIMES<br>SERVER 1:ONCE |
| | ⋮ | ⋮ | ⋮ |

| HOST GROUP NAME | WWN | LOGICAL LU | PHYSICAL LU | PORT NUMBER |
|---|---|---|---|---|
| HGROUP1 | WWN1 | LU0 | LU11 | PORT0 |
|  |  | LU1 | LU12 |  |
| HGROUP2 | WWN2 | LU0 | LU21 | PORT1 |
|  |  | LU1 | LU22 |  |
| ⋮ | ⋮ | ⋮ | ⋮ | ⋮ |

| SERVER ID | VIRTUAL SERVER ID | ORIGINAL VOLUME | DIFFERNCE VOLUME | TYPE |
|---|---|---|---|---|
| SERVER 1 | VIRTUAL SERVER 1 | INTEGRADED 1 | LU11 | BOOT |
|  |  | LU01 | LU12 | DATA |
| SERVER 1 | VIRTUAL SERVER 2 | LU02 | LU21 | BOOT |
| ⋮ | ⋮ | ⋮ | ⋮ | ⋮ |

| LICENSED PRODUCT | REMAINING NUMBER OF LICENSES |
|---|---|
| WINDOWS 2003 | 10 |
| COSMI NEXUS | 0 |
| ⋮ | ⋮ |

3101, 3102

SERVER SWITCHING METHOD AND SERVER SYSTEM EQUIPPED THEREWITH

CLAIM OF PRIORITY

The present application claims priority from Japanese application JP2007-302697 filed on Nov. 22, 2007, the contents of which are hereby incorporated by reference into this application.

BACKGROUND OF THE INVENTION

The present invention relates to high speed switching technologies for a fail-over, especially to a high speed switching technology for a disk image delivery system fail-over.

In a computer system attached to a SAN (Storage Attached Network), it is possible to change computers accessible to a particular LU (Logical Unit) with each other by changing the security settings for the LU in a storage subsystem attached to the SAN and for HBAs (Host Bus Adapters) integrated in the computers. Using this approach, a fail-over method, where a computer is changed to another one without changing LUs when the former computer breaks down, has been realized. Another fail-over method which achieves a similar effect by changing the WWNs (World Wide Names) of HBAs without changing the security settings has been realized. Both fail-over methods need expensive storage devices while being capable of providing high speed fail-over functions.

Therefore, there is a high demand for more inexpensive fail-over methods. Compared with the above mentioned fail-over methods, another method, where the disk image of the failed computer is delivered to a spare computer, has been proposed as an inexpensive fail-over method (JP-A-2006-11781). Because this disk image delivery method does not need expensive storage devices, it is possible to build an inexpensive system with high availability. However, there is a problem in that it takes time to complete the fail-over because the delivery starts after a failure occurs.

BRIEF SUMMARY OF THE INVENTION

In JP-A-2006-11781, the method to realize a high speed fail-over is disclosed. However, it is realized by installing an OS (Operating System) and applications quickly on a spare computer after a failure occurs. Therefore, because the time of the installation is always needed, there is a limit to speeding up this fail-over method.

A primary object of the present invention is to provide a high speed switching method for a fail-over and a system equipped with this method.

In the present invention, because the time of installation is eliminated by delivering a disk image to a standby server in advance or even when a disk image delivered in advance is different from that of a failed server, the time needed to reset the settings of unique information and to install additional pieces of software on the disk image is shorter than the time to redeliver an appropriate-disk image, a high speed fail-over method and a system equipped with this method can be provided, In other words, in the present invention, the disk image corresponding to one of the services provided by an active server is delivered in advance to a standby server, is and when receiving the report that the active server has failed, a management server that manages both the active server and the standby server judges whether it is possible for the standby server to perform the service of the failed active server or not. If possible, the management server instructs the standby server to perform the service of the active server. If the management server judges the standby server to be incapable of performing the service of the failed active server, the management server sends a proper disk image to the standby server in order for the standby server to perform the service of the active server.

In other words, in order to achieve the above mentioned object, present invention provides a server switching method for a server system that includes an active server, at least one standby server and a management server that are equipped with storage devices and process modules respectively and that are all connected through a network. In addition, the server switching method is configured in such a way that the management server delivers the disk image of an active server to a standby server in advance; holds service provision management server information in the storage device of its own; and when receiving the report that the active server has failed, judges whether it is possible for the standby server to perform the service of the failed active server or not based on the service provision management server information held in the storage device; and if possible, instructs the standby server to perform the service of the active server.

The above mentioned configuration of the present invention provides a server switching method with a high speed fail-over function and a system equipped with this method.

BRIEF DESCRIPTION IF THE DRAWINGS

FIG. 6 is a diagram showing Management Table of Server Hardware Information used in the first embodiment;

FIG. 7 is a diagram showing Table concerning Software is stored in Disk Image used in the first embodiment;

FIG. 8 is a diagram showing Information Table concerning Hardware included by Disk Image used in the first embodiment;

FIG. 9 is a diagram showing Management Table of Service Provision Server used in the first embodiment (before the occurrence of an accident);

FIG. 10 is a diagram showing Management Table of Service Provision Server used in the first embodiment (after the occurrence of an accident and during switching);

FIG. 11 is a diagram showing Management Table of Service Provision Server used in the first embodiment (after the completion of switching);

FIG. 12 is a diagram showing Table concerning Services and Network used in the first embodiment;

FIG. 13 is a diagram showing Table concerning Service Priority used in the first embodiment;

FIG. 14 is a diagram showing Failure Notification Management Table used in the first embodiment;

FIG. 30 is a diagram showing Difference Data Management Table used in the third embodiment; and FIG. 31 is a diagram showing License Management Table used in each embodiment.

DETAILED DESCRIPTION OF THE INVENTION

The preferred embodiments of the present invention will be described in detail hereafter with reference to the attached drawings. In this specification, a server is a term used to refer to an ordinary computer with communication function.

The First Embodiment of the Present Invention

Figure 1A:
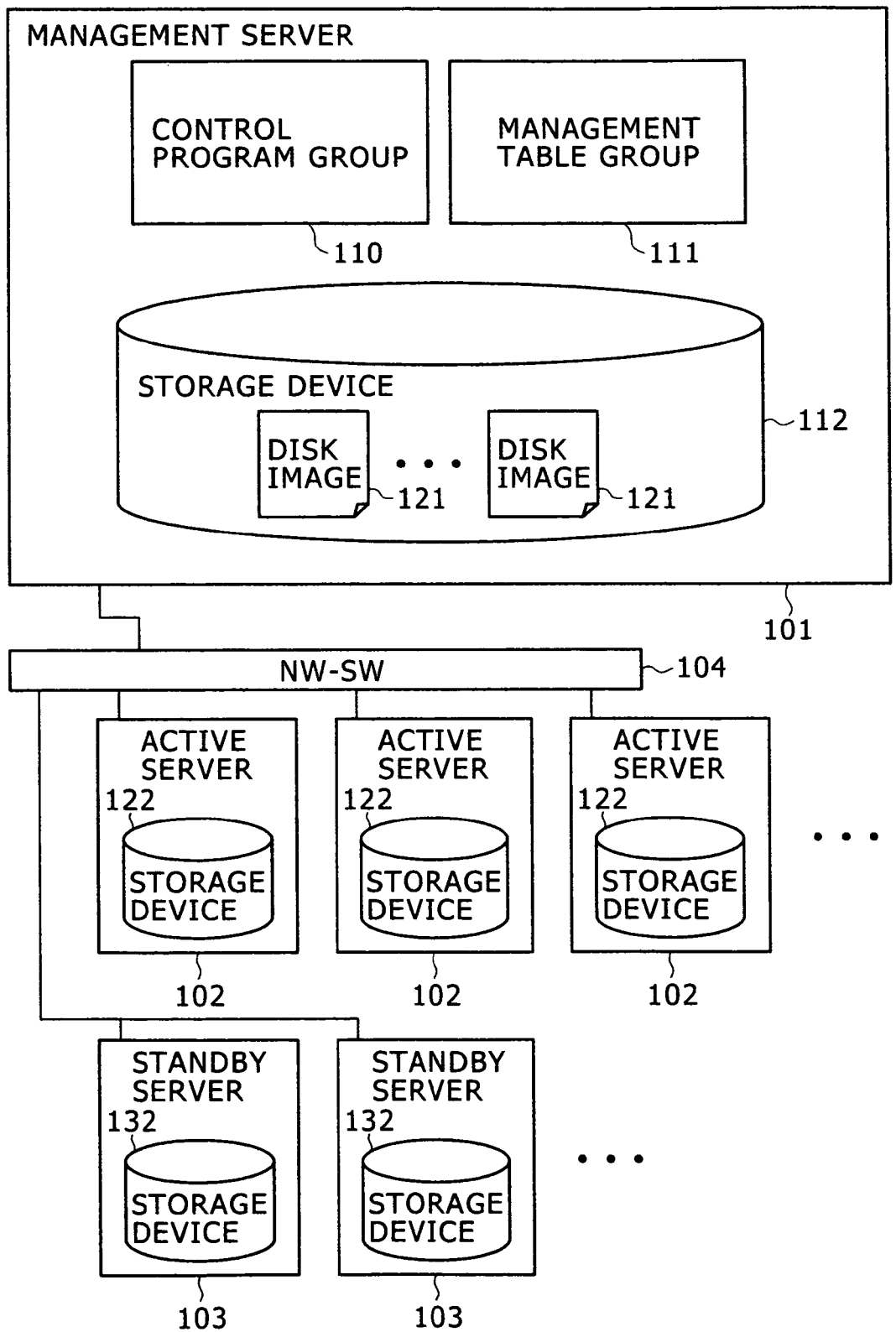
FIG. 1A is a schematic block diagram showing a system of a first embodiment of the present invention.

FIG. 1A is a schematic block diagram showing a system of the first embodiment of the present invention. A management server 101 is connected to active servers 102 and standby servers 103 via a NW-SW 104. The active servers 102 provide service services and when one of the active servers 102 breaks down, one of the standby servers 103 will provide the service of the failed server instead of the failed active server. The management server 101 keeps an eye on the active servers 102 and the standby servers 103. A primary object of this embodiment is to provide a server system, wherein a failure notification issued by any one of the active servers 102 is monitored and when one of the active servers 102 breaks down, one of the standby servers 103 will provide the service of the active server instead of the failed active server, with the result that the continuity of business can be enhanced.

The active servers 102 have integrated storage devices 122 and the standby servers 103 have integrated storage devices 132. OSs, middleware and applications to provide services are installed on the storage devices 122 and the storage devices 132 respectively. The management server 101 has an integrated storage device 112. Disk images 121, where software necessary to provide the service services is installed, are stored in the storage devices 112.

The contents of the disk images 121, which will be described later with reference to the attached drawings, are the disk images of the individual active servers necessary to provide the service services, the disk images with the unique information about the individual active servers removed, or the disk images where only the pieces of software used commonly by the active servers are installed, and the like.

When a failure occurs at any of the active servers 102, a disk image 121 that provides a similar service as the failed active server 102 does is delivered to one of the standby servers 103, with the result that the continuity of the service can be achieved. As to the disk image 121 delivered, if the disk image 121 that is the completely same disk image of the failed server 102 is delivered, the continuity of the service can be achieved only by the delivery. In this case, however, the same number of the disk images 121 as the number of the active servers must be prepared, with the result that an enormous amount of storage is needed.

Compared with the above approach, if the disk images with the unique information about the individual active servers removed are used, the disk images 121 with the same service services prepared can be commonly used although the setting the unique information about the individual active servers must be performed after delivery. Hence, the storage capacity necessary to store the disk images 121 can be reduced. In addition, if the disk images 121 where only the pieces of software used commonly by the active servers are installed are used, the disk images 121 can be shared throughout the server system. In this case, because the necessary pieces of software must be installed and the unique information for each OS and each piece of software is must be set after delivery, the speed of the fail-over decreases a little. However, this approach is much more advantageous in terms of workload and labor time than conventional approaches where installation must be performed on a server which has nothing installed.

Especially in this embodiment, because the time needed to complete a fail-over can be reduced by delivering disk images in advance to the standby servers 103, reinstallation should be avoided as much as possible. By delivering the disk images 121, where only the pieces of software used commonly are installed, in advance on the standby servers, reinstallation can be avoided and a fail-over can be realized more speedy. Control Program Group 110 includes a group of programs that realize the above mentioned high speed fail-over. Management Table Group 111 stores information tables concerning the active servers 102 and the standby servers 103, information tables concerning the disk images 121, and information tables concerning service services. These Control Program Group 110 and Management Table Group 111 will be described in detail later.

Figure 1B:
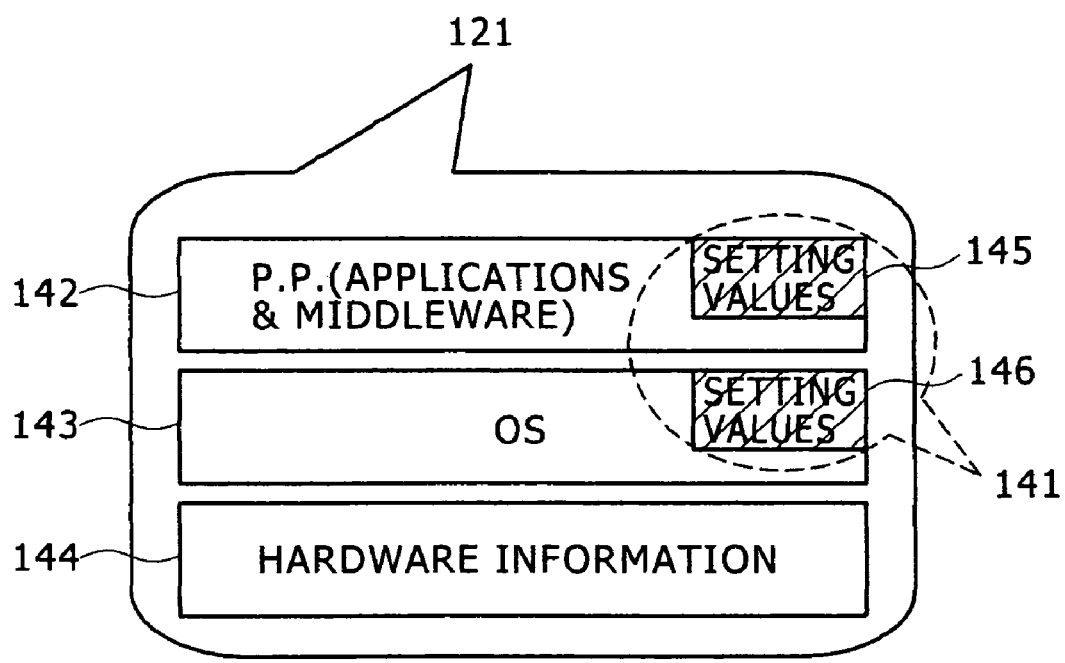
FIG. 1B is an explanatory diagram showing a disk image used in the system of the first embodiment.

FIG. 1B is a diagram showing an example of a disk image schematically. A disk image 140 in FIG. 1B includes P.P.s (Program Product) 142 that are pieces of application middleware, an OS 143, and hardware (architecture) information 144. In addition, the P.P.s 142 and the OS 143 include setting values 145 and 146 respectively as unique information 141. This disk image is typically a file that collects data stored in storage devices attached to servers. Getting the disk image back to the original server makes it possible to restore the server to its original status at the time when the disk image was obtained. In addition, bringing the disk image to a server with the same hardware configuration makes it possible to build a replica of the original server with the OS installed and the P.P.s set.

However, because the OS 143 and the P.P.s 142 shown in FIG. 1B hold information unique to each hardware (license, host name, IP address and the like), there is a case where a disk image cannot be brought into a system that provides service services only by building and delivering the replica of the disk image. To realize this object, proper setting for each server must be performed. As mentioned above, disk images that are used in various embodiments in various embodiments range from ones with OSs and P.P.s installed to ones without OSs and P.P.s, and they also range from ones with setting values for hardware and software set to ones without setting values.

Figure 2:
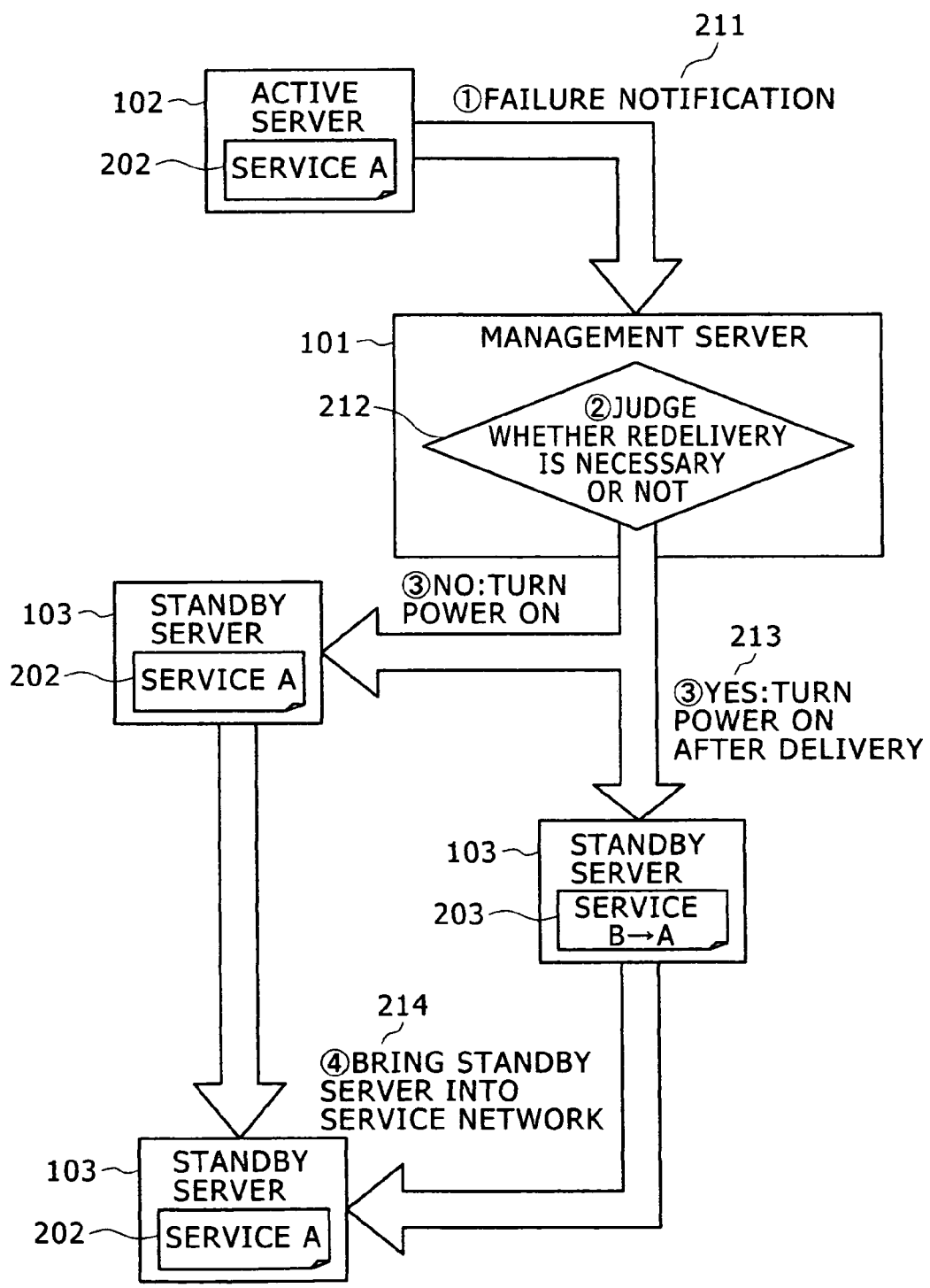
FIG. 2 is a diagram showing the fail-over procedures used in the first embodiment.

FIG. 2 is a diagram illustrating the overview of a high speed fail-over method in this embodiment. In addition, you should be careful that numbers in circles in FIG. 2 and others are represented as ones in parentheses in this specification. First, a disk image 121 is delivered to a standby server 103 in advance in consideration of the priorities of service services, operation records and the like. However, the delivery of a disk image in advance is not necessarily imperative. There will be the case where it is impossible to deliver a disk image in advance for the reason that the upper limit number of licenses is exceeded and the like. The service A 202 is provided to an active server 102. (1) The management server 101 receives a failure notification 221. (2) The management server 101 judges whether redelivery or resetting is necessary or not after identifying the disk image delivered to the standby server 103. (3)-1 (in the case of Yes) If the disk image delivered to the standby server 103 is one for other service such as the service B203, redelivery is necessary. Therefore the disk image for the service A202 is delivered to the spare disk 103. (3)-2 (in the case of No) Because the disk image for the service A202 has been delivered to the spare disk 103, the power to the standby server can be powered on. (4) Because the standby server 103 has the disk image for the service A202 after the previous step, the standby server is brought into the active service LAN, and the service is kept running. As roughly described above, if the disk image distributed in advance is the target disk image, a high speed fail-over can be provided. If the setting for the standby server can be accomplished through resetting other than redelivery, a high speed fail-over can be also provided. In this embodiment, how to build a target server by resetting without using redelivery will be described. In other words, the setting of tolerable ranges within which target image disks can be obtained by resetting will be described later. At the step (2), how to maintain the remaining servers will be determined, and if necessary, redelivery or resetting is performed on them.

Figure 3:
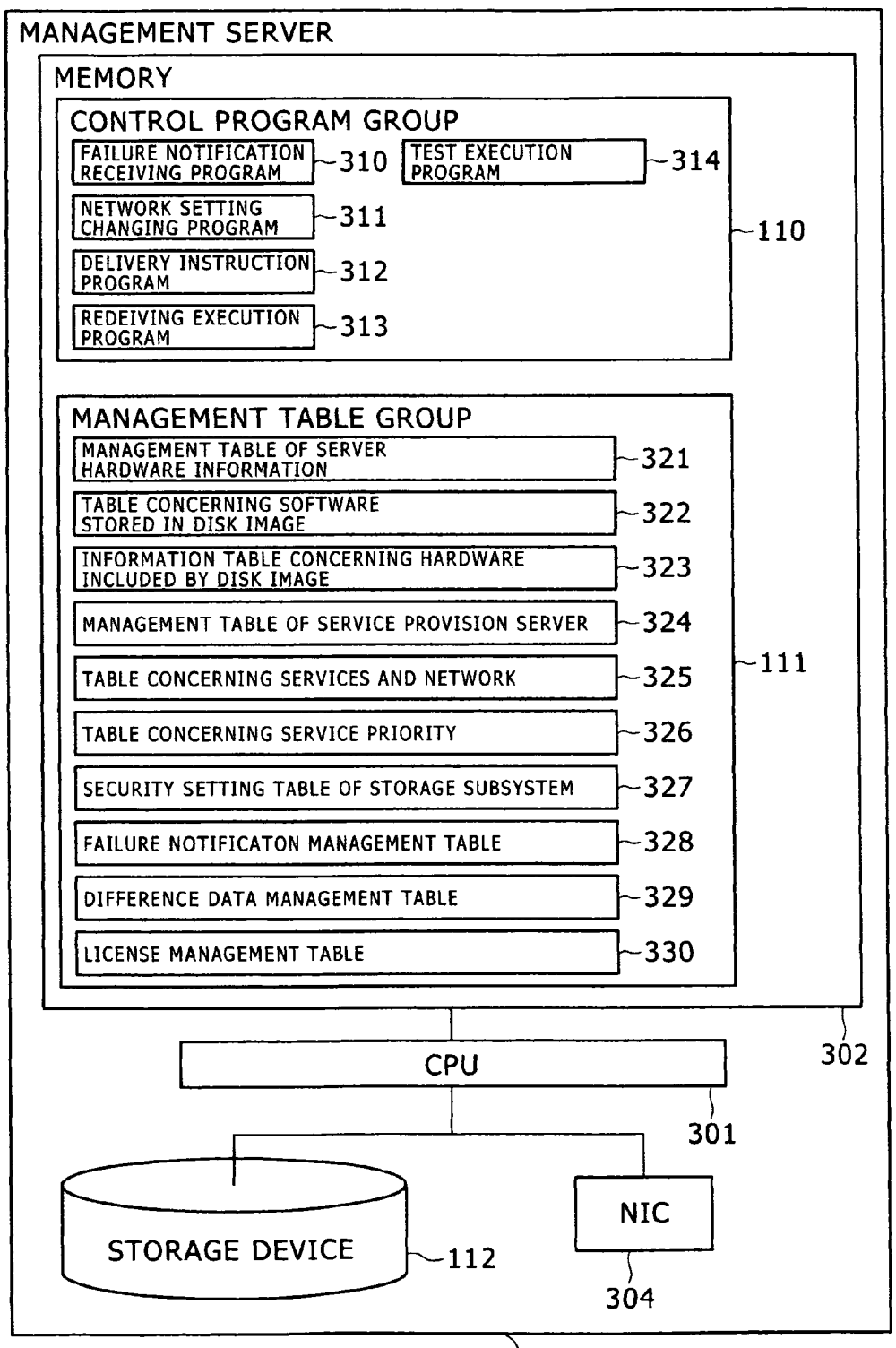
FIG. 3 is a block diagram showing a management server used in the first embodiment.

FIG. 3 is a diagram showing an example of the configuration of the management server 101 in this embodiment. The management server 101 includes a CPU (Central Processing Unit) 301, a memory 302 that stores programs and processes used in the CPU 301, a NIC (Network Interface Card) 304 that is used for the communication through an IP network, and a storage device 112 that stores programs and data. As mentioned above, the configuration of the server is similar to that of an ordinary computer.

Control Program Group 110 and Management Table Group 111 are stored in the memory 302. Control Program Group 110 (See FIG. 15) includes Failure Notification Receiving Program 310 (See FIG. 16), Network Setting Changing Program 311 (See FIG. 17), Delivery Instruction Program 312 (FIG. 18), Delivery Execution Program 313 (See FIG. 19), and Test Execution Program 314 (See FIG. 20).

Management Table Group 111 includes Management Table of Server Hardware Information 321 (See FIG. 6), Table concerning Software stored in Disk Image 322 (See FIG. 7), Information Table concerning Hardware included by Disk Image 323 (See FIG. 8), Management Table of Service Provision Server 324 (See FIG. 9, FIG. 10, and FIG. 11), Table concerning Services and Network 325 (See FIG. 12), Table concerning Service Priority 326 (See FIG. 13), Security Setting Table of Storage Subsystem 327 (See FIG. 24), Failure Notification Management Table 328 (FIG. 14), Difference Data Management Table 329 (See FIG. 30), and License Management Table 330 (See FIG. 31). The details about these tables will be described later with reference to the corresponding drawings respectively. Failure notifications received by the management server 101 are performed by a monitoring mechanism that is built using hardware and software possessed by the active server 102, that is, the target server for monitoring and the standby server 103.

Figure 4:
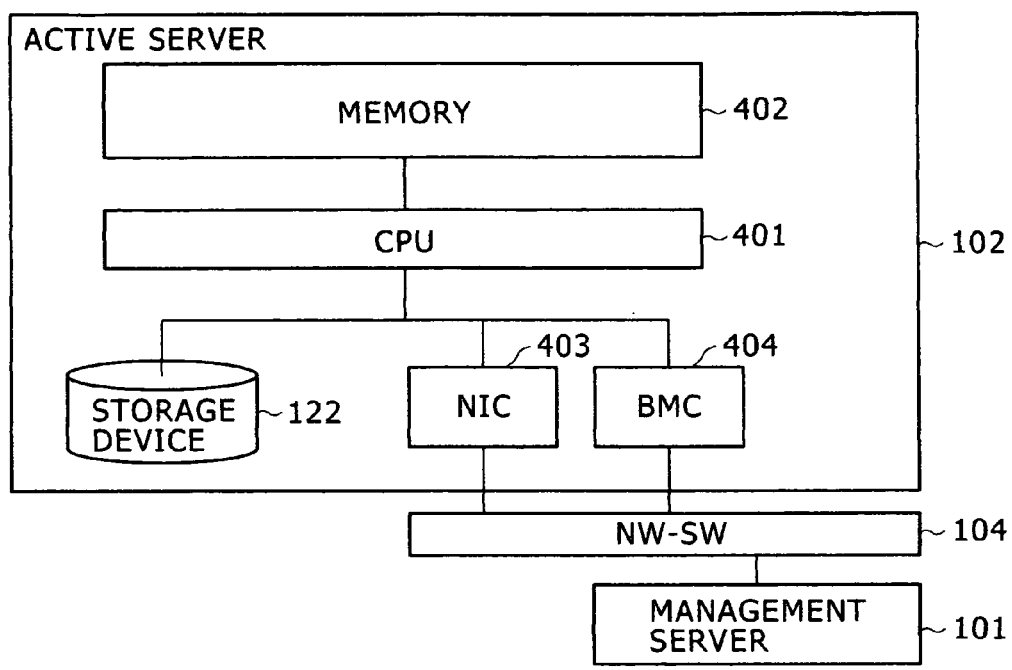
FIG. 4 is a block diagram showing an active server used in the first embodiment.

FIG. 4 illustrates the configuration of the active server 102. The active server 102 includes a CPU 401 that carries out calculation, a memory 402 that stores programs and processes used by the CPU 401, a NIC 403 that is used for the communication through the IP network, a BMC (Baseboard Management Controller) 404 that is used for the management server 101 to control power supply. The power to the active server 102 can be turned on or off through the BMC 404. The active server 102 and the management server 101 are connected via the NW-SW 104. A monitoring program (not shown) running on the active server 102 communicates with the management server 101 through the NIC 403, and informs the management server 101 of failures. The settings, loads, failures, and the like of the active server 102 can be monitored by the above mentioned monitoring program. There may be often the case where the NIC 403 is used only for management, so it is common that another NIC is installed for the service services. In addition, the BMC 404 also connects the active server 102 to the management server 101 through the network. Therefore the management server 101 can be informed of hardware failures and it can also turn on or off the power to the active server 102 forcibly through hardware means.

Figure 5:
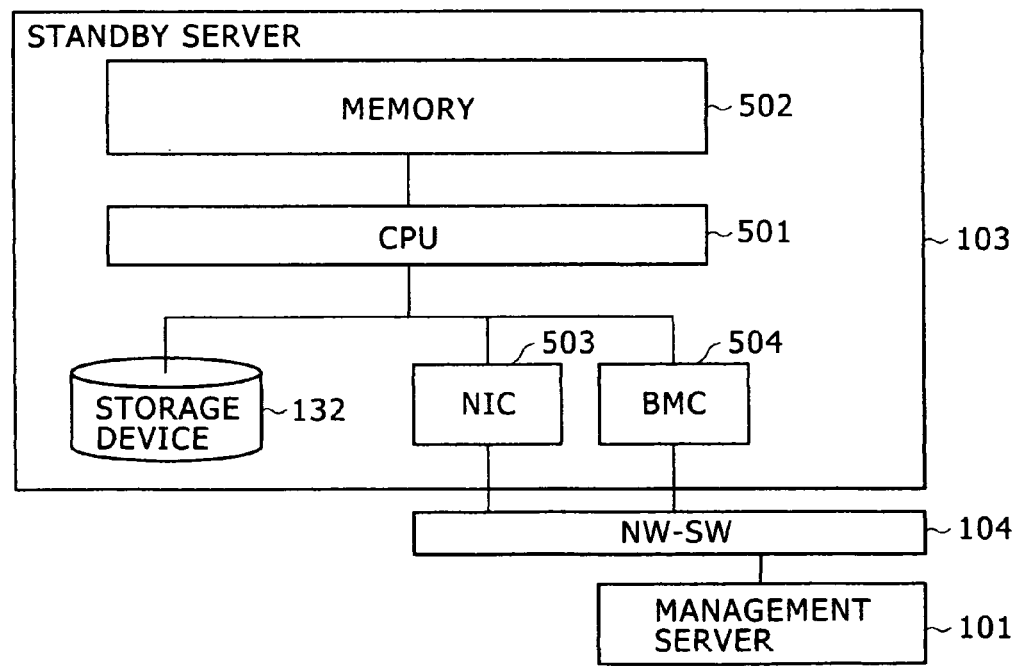
FIG. 5 is a block diagram showing a standby server used in the first embodiment.

FIG. 5 illustrates the configuration of the standby server 103. The standby server 103 includes a CPU 501 that carries out calculation, a memory 502 that stores programs and processes used by the CPU 501, a NIC 503 that is used for the communication through the IP network, and a BMC 504 that is used for the management server 101 to control power supply. The power to the standby server 103 can be turned on or off through the BMC 504. The standby server 103 and the management server 101 are connected via the NW-SW 104. A monitoring program (not shown) running in the standby server 103 communicates with the management server 101 through the NIC 503, and informs the management server 101 of failures. The settings, loads, failures and the like of the standby server 103 can be monitored by the above mentioned monitoring program. There may be often the case where the NIC 503 is used only for management, so it is common that another NIC is installed for the service services. BMC 504 also connects the standby server 103 to the management server 101 through the network. Therefore the management server 101 can be informed of hardware failures of the standby server 103 and it can also turn on or off the power to the standby server 103 forcibly through hardware means. After delivering the disk image in advance to the standby server 103, the standby server 103 can be run regularly or irregularly in order to perform maintenance works such as running operation check programs or applying patches to the standby server 103.

FIG. 6 illustrates Management Table of Server Hardware Information 321 in detail, one table of Management Table Group 111 that is stored in the memory 302 of the management server 101. Information concerning hardware and software integrated in or attached to each server is collected in this table. The column 601 stores server identifiers with which servers can be uniquely identified.

The column 602 stores CPU architectures, that is, the types of CPUs that acts as process modules. Fundamentally it is difficult for the servers with different CPU architectures (types) to share the disk image for booting an OS. Therefore it is important to decide the appropriate CPU architecture using some means in order to avoid delivering an inappropriate CPU architecture (type of the process module) when delivering a disk image.

The column 603 stores UUIDs (Universal Unique Identifiers). UUIDs are designated in such a way that they are fundamentally built in order not to be duplicated universally. Therefore if UUIDs are allocated to individual servers, they can be identifiers to assure uniqueness to individual servers. So they can be candidates for the server identifiers in the column 601 and they would be very useful for the management to cover a broad range of servers. However, a system administrator can use identifiers that he want to use to identify servers, and as long as the target servers to be managed are not duplicated, it is not necessarily imperative to use UUIDs as server identifiers. For example, hast names, IP addresses, MAC addresses (Media Access Control Addresses) and the like can be also candidates.

The column 604 to 606 store information concerning HBAs (Host Bus Adaptors). The column 604 stores the numbers of HBAs. Using this information, the number of HBAs that a server holds can be obtained so that the number of HBA device drivers to be incorporated can be examined whether it is adequate or not with reference to the hardware included in the disk image that will be described in detail in FIG. 8.

The column 605 stores the WWNs of HBAs. The WWNs are identifiers to identify servers in the security setting of a storage subsystem shown in FIG. 24 in a SAN environment in the second embodiment. Therefore there is a case where the WWNs play a role as server identifiers in the system where the SAN environment is indispensable.

The column 606 stores the types of the HBA device drivers. If the locations where the device drivers are to be installed are written in the column 606, even when the device driver with different type is incorporated, the location where a necessary device driver is to be incorporated is explicitly provided, with the result that automatic incorporation of device drivers can be realized. The column group concerning HBAs plays an important role in SAN environments, which will be described in detail in the explanation of the second embodiment of the present invention.

The column 607 to 609 store information concerning NICs. The column 607 stores the number of NICs. In a similar way to the column 604, using this information, the adequate number of NIC device drivers to be incorporated can be examined. In addition, whether the number of the NICs is adequate or not can be examined when IP information (IP addresses, subnet masks, default gateways, and the like) needed to perform the service services are allocated to the NICs. If the number of the NICs is inadequate, multiple pieces of IP information would be allocated to one NIC. If this causes a problem in terms of the operation or performance, this allocation should be averted by some means with the use of the above information.

The column 608 stores MAC addresses of the NICs. Because the MAC addresses are unique addresses, they may play a role as the server identifiers.

The column 609 stores the types of the NIC device drivers. If the locations where the device drivers are to be installed are written in the column 609, even when the device driver with different type is incorporated, the location where a necessary device driver is to be incorporated is explicitly provided, with the result that automatic incorporation of device drivers can be realized.

The column 610 to 612 store information concerning storages. It is very important that when the disk image is delivered, each storage environment is compatible with the other.

The column 610 stores the names of the connection I/Fs (interfaces) between the servers and the storage devices. If the connection interface between a server and a storage device are not compliant with each other, the replacement of the storage device driver is indispensable. Therefore when a disk image is delivered, whether the necessary works to make the delivered disk image work properly has been performed or not can be examined using above information.

The column 611 stores the values of the storage capacities of storage devices. If the volume of the disk image to be delivered is larger than the value of the corresponding capacity written in the column 611, the disk image cannot be stored perfectly, with the result that the server cannot operate properly. In contrast with this, if the volume of the disk image is smaller, there is no problem on this matter as to the operation of the server. Therefore there may be the operation with this matter neglected depending on some management policies, The column 612 stores the type names of storage devices, that is, the type name of storage devices to boot OS or the type name to store data. The storage devices to store data are often deployed as external ones attached to a SAN environment. In this case, it may be necessary to take over the services performed by the data disks attached to the SAN environment. The storage devices attached to the SAN environment will be described in detail in the explanation of the second embodiment of the present invention.

As mentioned above, this table is also applicable to a SAN configuration. If the values of memory capacities are added to this table (not shown in FIG. 6), this table can be used for searching for a server that has performance to perform a certain service. Therefore it is possible to select a server that has performance suited to a certain application when a failover is needed. Information of this table can be automatically collected from servers. However, there is also the case where information of this table is input by an administrator. However, as to the column 612, although the operation, where each initial input is set to "boot" and then no changes are made, can be thought of, each initial input is generally input manually by an administrator. In addition, as to the column 601, inputs to this column can be omitted by designating one of other columns in this table or some combination of multiple columns in this table. The elements of this column can be numbered in ascending order.

FIG. 7 shows one configuration example of Table concerning Software stored in Disk Image 322 that is one table of Management Table Group 111 in the management server 101. This table includes information concerning software stored (installed) on disk images, unique setting information, and information concerning P.P.s that are permitted to be additionally installed on an existing installed system and their versions are collected in this table.

The column 701 stores service identifiers. There are some description methods for the column 701 such as one where the first server for service A, the second server for service A and so on are described to the extent of specifying individual server levels (751 to 754); one where installation of software common to service A or service B is described to the extent of specifying individual service levels (755, 756); and one where installation of software common to system 1 or system 2 is described to the extent of specifying common environmental levels (757,758).

The column 702 stores disk image names. The disk image names are the identifiers for specifying individual disks. Here the contents of a disk image will be described. In a similar way to the column 701, it is desirable to change the contents and the types to be stored depending on individual objects. For example three types of disk images will be described below. Three types of disk images includes following (1), (2) or (3).

(1) OS+middleware and applications+unique information;
(2) OS+middleware and applications (unique information is omitted); and
(3) OS (middleware and applications are not installed and unique information is omitted). The advantage of (1) is that only the delivery of the disk image can make the service start.

In addition, if the disk image delivered to the standby server is completely the same as that of the failed active server, only booting the standby server can complete the fail-over, with the result that a very high speed fail-over can be realized. The advantage of (2) is that after the delivery of the disk image, only setting unique information can make the service start. When compared with (1), (2) takes a little more time than (1) because the time to set unique information is needed. However (2) may be advantageous in terms of software licenses. When considering today's software license system, there is a considerable possibility that an additional license is required in the case of the method (1), while the least possibility in the case of the method (2). This is because the disk image in the case of the method (2) may be considered as a backup disk image. The advantage of (3) is that although this method requires the installation of necessary P.P.s and the of the unique information after delivery, which takes a longer time than (1) or (2), this method can provide a fail-over much faster than conventional approaches where installation must be performed on a server which has nothing installed. In addition, (3) is the most advantageous in terms of software licenses mentioned above. In the method (3), additional licenses are not required because P.P.s are not installed on the standby server. Spare licenses can be used by the active servers, which results in the increased number of licenses per active server. Therefore a system with high availability can be built at cheaper cost. For example, license management is performed using License Management Table 330 (See FIG. 31). In view of disk image management, because the method (3) has the largest common portion, it can do with the least number of disk images. On the other hand, because the method (2) has a larger fixed portion than the method (3), it needs a larger number of disk images. In the case of the method (1), because each server has its specific disk image, the total number of disk images for the method (1) is larger than that for the method (2).

The column 703 stores the types of OSs. Adding information concerning SPs (service packs) and patches will make it easier to judge whether P.P.s to be additionally installed are compliant with the prerequisites or not. In addition, this is advantageous in that the server maintenance becomes easier in view of security. Although specific OSs are listed in this table, other OSs can be listed likewise, with the result that the effectiveness of this embodiment is increased.

The column 704 stores the names of CPU architectures corresponding to the OSs. If the disk image that has an incompatible CPU architecture is delivered, the server cannot provide its service. Therefore by using information listed in this column, it is avoidable to deliver a disk image with an incompatible CPU architecture to a server. CPU architectures other than the specific CPU architectures listed in this table can be listed likewise, with the result that the effectiveness of this embodiment is increased.

The column 705 stores host names. Generally speaking, an administrator gives the servers their host names because some applications may identify servers with their host names. However, automatic naming can be performed according to the naming rule designated by the administrator. The column 706 stores OS passwords.

The column 707 stores IP information. IP information includes IP addresses, subnet masks, default gateways and the like. As to the IP addresses, a range of IP addresses can be listed instead of a specific address being listed. Therefore, one of the idle addresses within the range can be used, so that the resources of IP addresses can be effectively utilized. However, some administrators or applications use IP addresses as the identifiers to identify servers. Therefore there are cases where each server is given a unique IP address explicitly by the administrator.

The column 708 stores P.P. names. The names of pieces of middleware and the names of applications necessary to provide services, and information about their versions are listed in this column. By referring to this column, information about P.P.s necessary to perform individual services can be obtained.

The column 709 stores unique information concerning P.P.s. This information includes IP address (logical IP address) and port numbers used by individual P.P.s. If the port numbers are duplicated, some pieces of software do not run or others do not operate properly even if they run. By listing the port numbers used by P.P.s in this column in order not to duplicate the port numbers, the above troubles can be avoided. If the costs needed to install additional P.P.s is provided in this column, this provides information for making a decision as to whether to install additional P.P.s and set the unique information or to deliver the corresponding disk image again. In addition, if the installation locations of P.P.s and environmental variables are listed in this column, it will be ensured that necessary settings are performed and P.P.s are installed on the right locations expected by other P.P.s using information in this column.

The column 710 stores coexistence conditions with other P.P.s. P.P.s and their versions that can coexist with each other in the same servers and the limitations concerning some operation environments such as JRE (Java Runtime Environment) are listed in this column. This provides information for making a decision as to whether to install additional P.P.s and set the unique information without redelivery or to deliver the corresponding disk image again in order to perform a fail-over.

The column 711 stores delivery costs. A primary object of this embodiment is to provide a high speed fail-over. Therefore, it is very important how to prepare the destination of the fail-over. In this case, it is necessary to select more inexpensive method after identifying the time of redelivery per disk image (per service) and at the same time taking into consideration the times needed to install additional P.P.s (listed in the column 709).

Because this table includes software information installed on disk images, it is avoidable to deliver a disk image to a server with an incompatible hardware configuration such as a CPU architecture using information listed in this table. In addition, it is also possible to make up the difference between the disk image already delivered and the disk image suited to the service to be performed by taking advantage of this table.

Data to be input to the column 703, the column 704, the column 705, and the column 707 in this table can be collected from the server from which disk images are obtained with the use of agent programs or information gathering commands of OSs. An administrator can also input data to those columns. As to other columns, data is input by an administrator or data is input at the same time as disk images are obtained or P.P.s are installed. As to the column 710, data is often input by an administrator, but data to be input can be also listed based on the data which is collected per P.P. from servers on the Internet or on the intranets.

FIG. 8 illustrates Information Table concerning Hardware included by Disk Image 323 in FIG. 3 in detail. This is the hardware configuration of the server from which the disk image was obtained. In other words, it is the hardware configuration necessary for the disk image to be able to operate properly. To be concrete, by comparing FIG. 8 with FIG. 6, it is possible to judge whether the hardware configuration to which the disk image is applicable is compatible with the hardware configuration of the destination server or not. In addition, in a similar way, it is also possible to judge whether the difference between them is within the tolerable range or not.

The column 801 stores disk image names. The column 802 stores CPU architecture names.

The column 803 stores UUIDs. There are only a few cases where OSs or some pieces of software do not run properly after the delivery of disk images because of incompatibility of UUIDs. However, there are some cases where platforms to be used are specified by hardware identifiers. In such cases, it is necessary to make the UUIDs coincide virtually using server virtualization technology.

The column 804 to 809 store hardware information concerning I/O devices such as HBAs and NICs just like the column 604 to 609 in FIG. 6.

The column 810 and 811 store hardware information concerning storage devices just like the column 610 and 611 in FIG. 6. In particular, attention should be paid to the values of the storage capacities listed in the column 811. If one of the values of the column 811 in FIG. 8 is smaller (the storage capacity is smaller than the volume of the corresponding disk image), the disk image can not be stored perfectly, with the result that the fail-over cannot be completed properly. Data to be input to this table can be collected with the use of agent programs or information gathering commands of OSs and also it can be automatically collected.

The FIG. 9 illustrates Management Table of Service Provision Server 324 in FIG. 3 in detail. It shows the contents of Management Table of Service Provision Server 324 under the condition that all active servers are normal. This table stores server types (active/spare), provided services, delivered disk images, delivery statuses, failure statuses, service statuses, the conditions for standby servers should satisfy when fail-over measures are performed, presence or absence of data disks, and their identifiers. Because the statuses of the servers can be grasped using this table, it becomes possible to take measures when failures occur.

The column 901 stores server identifiers. The column 902 stores server types (active/spare).

The column 903 stores service identifiers. If a section of the column is for an active server, the name of the service provided by the active server is listed in the section. If it is for a standby server, the identifier of the service delivered in advance is listed in the section. When a failure occurred, the necessary service can be confirmed by referring the column 903 of the failed active server, and whether the disk image corresponding to the necessary service has been delivered to a standby server can be judged by referring the column 903 of the standby server.

The column 904 stores disk images. The column 905 stores delivery statuses. The delivery statuses store information about whether disk images have been delivered or not, and about whether unique information has been delivered or not.

The column 906 stores failure statuses. This stores failure information about active servers. This is not listed in this example table, but by observing standby servers in standby state and listing the failure status of a standby server in this column if the standby server fails, it becomes possible to take measures to the standby server failure. For example, the standby server failures can be checked by running check programs on the standby servers regularly or irregularly, and when a standby server fails, the delivery configuration of the disk image of the standby server can be reconfigured in consideration of the priority and the operational status and the like of the standby server, with the result that the availability can be increased.

The column 907 stores service statuses. As to active servers, information about active servers' statuses whether they are providing service services or not (down) is listed, and as to standby servers, information about standby servers' standby states whether they are in hot-standby state, cold-standby state or fail-over state is listed. When a standby server is in hot-standby state, it is desirable to turn off the power to the standby server in order to reconfigure the configuration of the standby server. If it is on cold standby state, the immediate redelivery can be performed. It is necessary to turn on the power to the standby server before the resetting is performed. Information this column shows about standby servers makes it possible to reconfigure the delivery configuration of the disk images of standby servers.

The column 908 stores coincidence ranges within which some pieces of unique information should coincide when fail-over measures are performed. For example, the row 951 and 952 designate the coincidence ranges with in which P.P.s, OSs, and architectures and the like should coincide. Even if the disk image delivered in advance to a standby server has different unique information from desired one, resetting necessary pieces of unique information may allow the fail-over to be performed with lower cost than redelivery of the suited disk image to the standby server. When a disk image name is designated as shown in the row 953, if the disk image has not been delivered in advance to the server, it is necessary to redeliver a suited disk image to the server This table should be completed by an administrator inputting desired data on the basis of his operation policy.

The flexibility of the coincidence range (the column 908) will be described in detail.

The flexibility of the coincidence range for disk images: the settings of unique information for a disk image can not be allowed to change, so that there is no flexibility. The availability can be increased by using disk images and settings that ensure secure operations.

The flexibility the coincidence range for P.P.s: Even if two disk mages are different from each other, the difference can be made up by changing the settings for unique information, so that there is a lot of flexibility. A server for a fail-over can be prepared only by changing the settings, so that changing the settings for unique information for P.P.s meets the needs required by fail-over measures.

The flexibility of the coincidence range for OSs: Even if two disk mages are different from each other and different P.P.s have been installed, One disk image can be used instead of the other by additionally installing and setting necessary P.P.s as long as they are allowed to be installed by the coexistence conditions with other P.P.s of Table concerning Software stored in Disk Image (See the column 710 in FIG. 7), so that there is much more flexibility. There may be possibility that the redelivery can prepare the fail-over destination more quickly than the resetting when evaluating costs stored in P.P. unique setting, so that it becomes very important to evaluate preparation costs (See FIG. 7).

The flexibility of the coincidence range for architectures: To provide a service, it is necessary to specify architecture along with P.P.s. Therefore, designating the tolerant range for only architecture itself is meaningless. However, there are some services that can be provided if only specific P.P.s are installed even if the architecture and an OS are different. In other words, by designating only a P.P. without designating architecture and an OS, a wide range of the fail-over destination candidates can be designated, with result that the resources can be effectively utilized.

FIG. 10 describes Management Table of Service Provision Server 324 in FIG. 3 in detail. Especially it shows that an active server is broken down and a service is switched. The constitution of the table is the same as that in FIG. 9. Therefore, as to each column, please refer to FIG. 9. To be concrete, the column 9* in FIG. 9 is corresponding to the column 10* in FIG. 10. The case where the server 3 listed in the row 1053 is broken down will be described. It will be assumed that the server 3 is broken down and a fail-over is taken using the server 4 that is a standby server. The area surrounded by a bold line is a target area where input items will be changed.

The input item Failure Status in the section that the column 1006 and the row 1053 have in common has been changed to "In Failure". The input item Failure Status in the section that the column 1006 and the row 1054 have in common has been changed to "B-1 being switched", which shows that the service B-1 is in failure.

The input item Delivery Status in the section that the column 1005 and the row 1054 have in common has been changed to "In Delivery". This is because although the condition shown by the column 1008 is "Disk Image" coincidence at the failed service, the disk image already delivered is for a different service as shown by the column 903 in FIG. 9, so that the redelivery is required.

The input item Service Status in the common section of the column 1007 and the row 1053 has been changed to "Down". This shows that the service is not provided. In addition, the input item in the common section of the column 1007 and the row 1054 has been changed to "In Fail-over". This shows that preparation for switching of the servers is being done.

FIG. 11 illustrates Management Table of Service Provision Server 324 in FIG. 3 in detail. Especially it shows the status where the switching of the servers has been completed. The constitution of the table is the same as that in FIG. 9. Therefore, as to each column, please refer to FIG. 9. As mentioned above, to be concrete, the column 9* in FIG. 9 is corresponding to the column 10* in FIG. 10.

The input item in the common section of the column 1103 and the row 1154 shows that the server 4 has taken over the service that the failed active server provided. The input item in the common section of the column 1105 and the row 1153 is null. To recover the input item, the server 3 must be replaced and the reinstallation (redelivery) is needed. The input item in the common section of the column 1105 and the row 1154 shows that the delivery and settings of unique information have been completed. The input item to store Service Status in the common section of the column 1107 and the row 1154 stores "Serviced", which shows that the service is being provided.

Figure 15:
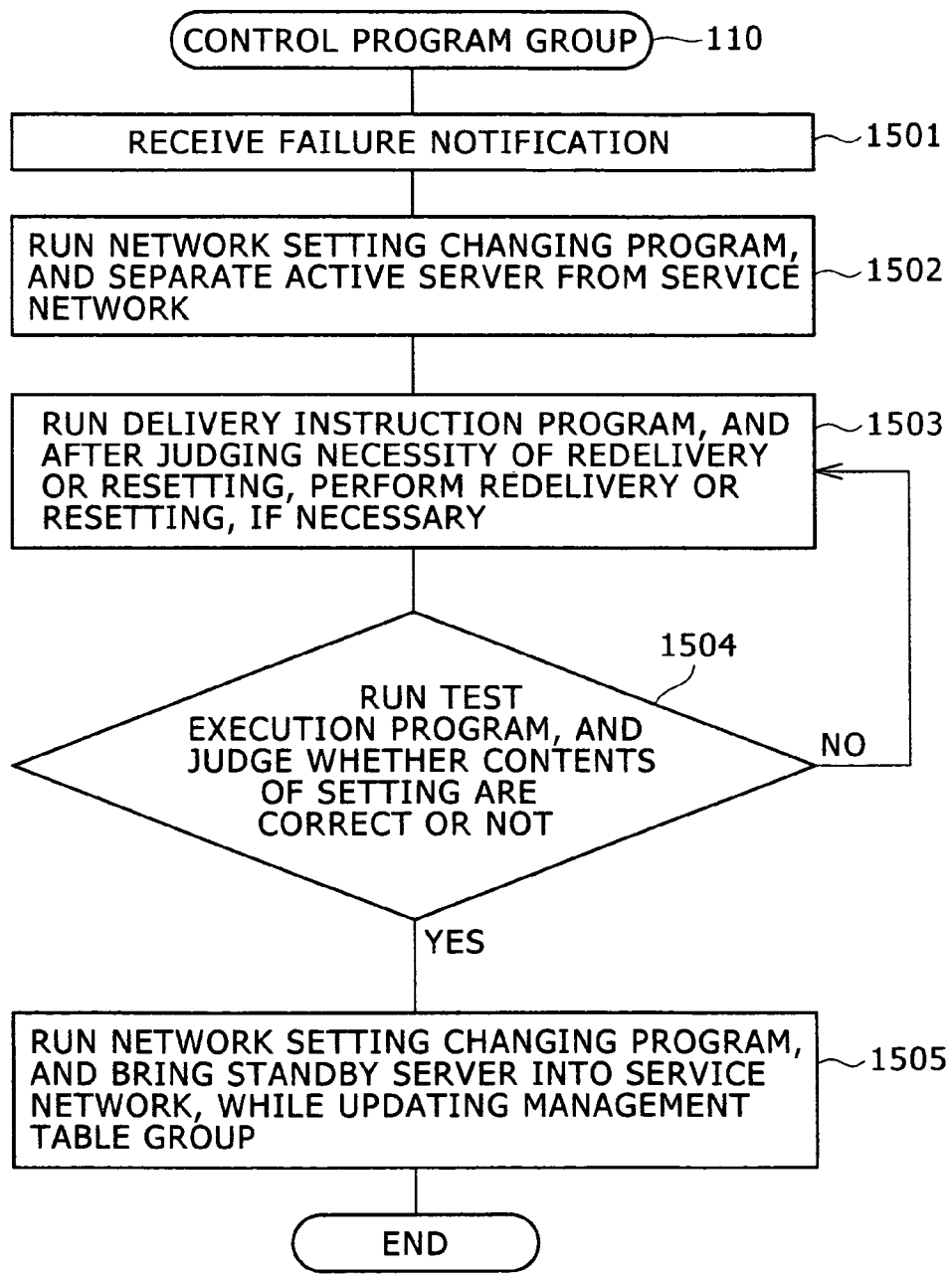
FIG. 15 is a diagram showing the process flow of Control Program Group used in the first embodiment.

More detail about FIG. 9, FIG. 10, and FIG. 10 described above will be also given in the explanation of the flowcharts in FIG. 15 and subsequent figures.

FIG. 12 illustrates Table concerning Services and Network 325 in FIG. 3 in detail. This table is used to manage the settings for networks to which servers providing services belong.

The column 1201 stores Service IDs (identifiers). The column 1202 stores VLAN IDs (identifiers). The column 1203 stores MAC addresses of the servers providing services. The column 1204 stores communication protocol names that the services use.

The column 1205 stores Bridge IDs (identifiers) that are uniquely given to individual NW-SWs. The column 1206 stores Port IDs (identifiers) that are uniquely given to individual ports in the NW-SWs. The column 1207 stores IP information.

The settings for the servers providing services, the NW-SWs and networks are managed with the use of the row 1251 to 1253 of this table. The settings for the services, the NW-SWs and networks are managed with the use of the row 1255 and 1256. When some port or some IP address has been already used, designating the ranges of port identifiers or the ranges of IP information in the column 1206 and column 1207 where IP information is stored instead of designating the port or the IP address makes it possible to use other vacant port or IP address. This not only makes it possible to change setting values flexibly, but also can avoid the risk that duplication of the setting information prevents the service from being continuously provided when the designated disk image (in which unique information is already set) is delivered.

The column 1257 includes the settings concerning the network group to which standby servers that are not engaged in services belong. Because it is not allowed to deliver disk images and change settings through service networks, it is necessary to assure such a network group to which reserved standby servers belong.

FIG. 13 illustrates Table concerning Service Priority 326 in FIG. 3 in detail. Setting priorities to services makes it easy to determine the disk images delivered in advance to standby servers. When a service with a higher priority occurs after a service with a low priority, there may be a case where it is desirable to deal with the service with a higher priority preferentially with fail-over measures to the service with a lower priority interrupted. This table makes it possible to materialize such an operation policy.

The column 1301 stores service IDs (identifiers). The column 1302 stores the initial values of priorities. Therefore, even if the priorities have been dynamically changed, an administrator can recover the initial values of priorities whenever he likes.

The column 1303 stores current values of priorities. This column is used to meet the need to raise the priorities of other servers because the probability of the failure reoccurrence of a standby server that took over the service of a failed server is considered low. In this way, delivering disk images of servers with higher probability of the failure occurrence to standby servers makes it possible to realize a high speed fail-over with a higher probability.

FIG. 14 illustrates Failure Notification Management Table 328 in FIG. 3 in detail. Taking advantage of this table makes it possible to give such flexibility to the operation method as changing measures per each failure notification or combining failure notifications with service priorities.

The column 1401 stores notification IDs (identifiers) The column 1402 stores failure information, thresholds for failures, and the value ranges for failures. The column 1403 stores priorities, and the thresholds for taking fail-over measures (the number of failure notifications).

Using information included in this column makes it possible to increase such flexibility of responses as taking immediate fail-over measures to some failure notifications and putting off taking fail-over measures to other failure notifications until the failures frequently occur. In addition, adding performance failures to this column makes it possible to obtain a higher performance server and replace the failed server with this server when a failure has occurred. For example, in such an environment as a data center where servers with various performances are maintained and provided, it can be expected that the operation and services are performed by upgrading standby servers and replacing a failed server with a higher performance server when a failure has occurred. In this case, although the agreement with the data center may be needed in advance, a user will be able to reduce the cost of the system because a server with necessary performance can be obtained on demand.

FIG. 15 shows the process flow of Control Program Group 110 of management server 302 that is used to realize a disk image delivery system fail-over in this embodiment.

At Step 1501, Failure Notification Receiving Program 310 receives a failure notification and judges whether to separate the server that caused the failure notification. If the server is separated, the flow proceeds to Step 1502. At Step 1502, Network Setting Changing Program 311 is run and the failed active server 102 is separated from the service network.

At the Step 1503, Delivery Instruction Program 312 is run, and after the necessity of redelivery or resetting being judged, Delivery Execution Program 313 is run if necessary and the delivery or resetting is performed.

At Step 1504, Test Execution Program 314 is run, and after the check of the settings and the operation, whether the redelivery or resetting was correctly performed or not is judged. If the redelivery or resetting was correctly performed, the flow proceeds to the next step. If the redelivery or resetting was not correctly performed, the flow goes back to Step 1503, the redelivery or resetting is performed. In the case where the administrator judges it unnecessary or the disk image that had been tested beforehand was delivered, this step can be omitted.

At Step 1505, Network Setting Changing Program 311 is run, and the standby server is brought into the service network. Then the program updates Management Table Group 111.

Figure 16:
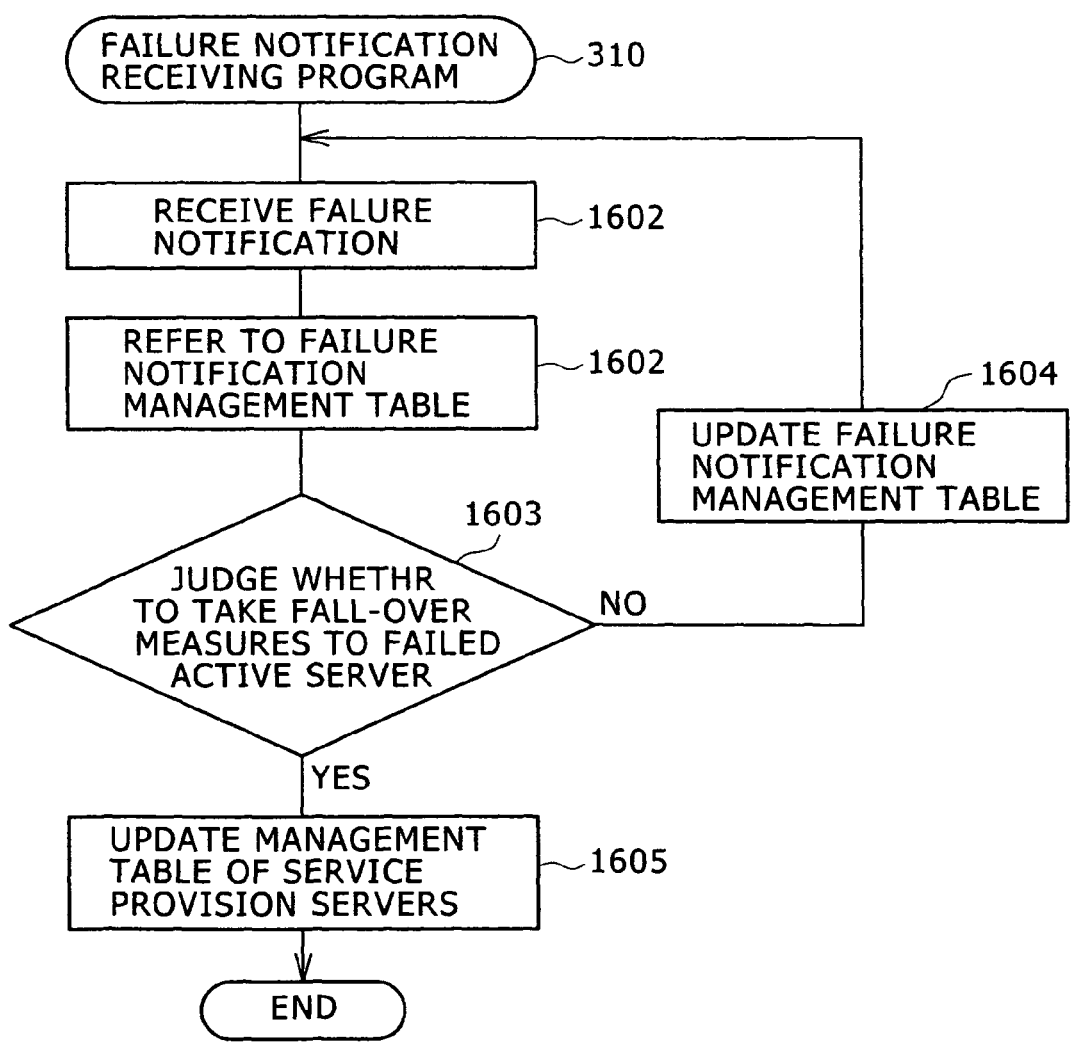
FIG. 16 is a diagram showing the process flow of Failure Notification Receiving Program used in the first embodiment.

FIG. 16 shows the process flow of Failure Notification Receiving Program 310 in FIG. 3. Failure Notification Receiving Program has a mechanism to judge whether to take fail-over measures.

At Step 1601, Failure Notification Receiving Program receives a failure notification. This notification includes the value to represent the identification of a failed server 102. It also includes the contents of the failure and the failure state. It is desirable for this notification to be sent at a time, but it may be sent at several times, being divided into several segments in consideration of the network loads. If the failed server is a standby server 103 and it is difficult for the standby server to remain to be in standby mode, the failure occurrence is listed in Management Table of Service Provision Server 324 (See FIG. 9 to FIG. 11) and the standby server cannot be selected as a fail-over destination.

At Step 1602, Failure Notification Receiving Program refers to Failure Notification Management Table 328.

At Step 1603, Failure Notification Receiving Program judges whether to take fail-over measures to the failed active server or not. If the fail-over measures are not taken, the flow proceeds to Step 1604. If the fail-over measures are taken, the flow proceeds to Step 1605.

At Step 1604, Failure Notification Receiving Program updates Failure Notification Management Table 328 and the flow goes back to the first step where Failure Notification Receiving Program waits for a failure notification.

At step 1605, Failure Notification Receiving Program updates the corresponding failure status in Management Table of Service Provision Server 324 and ends the process.

Figure 17:
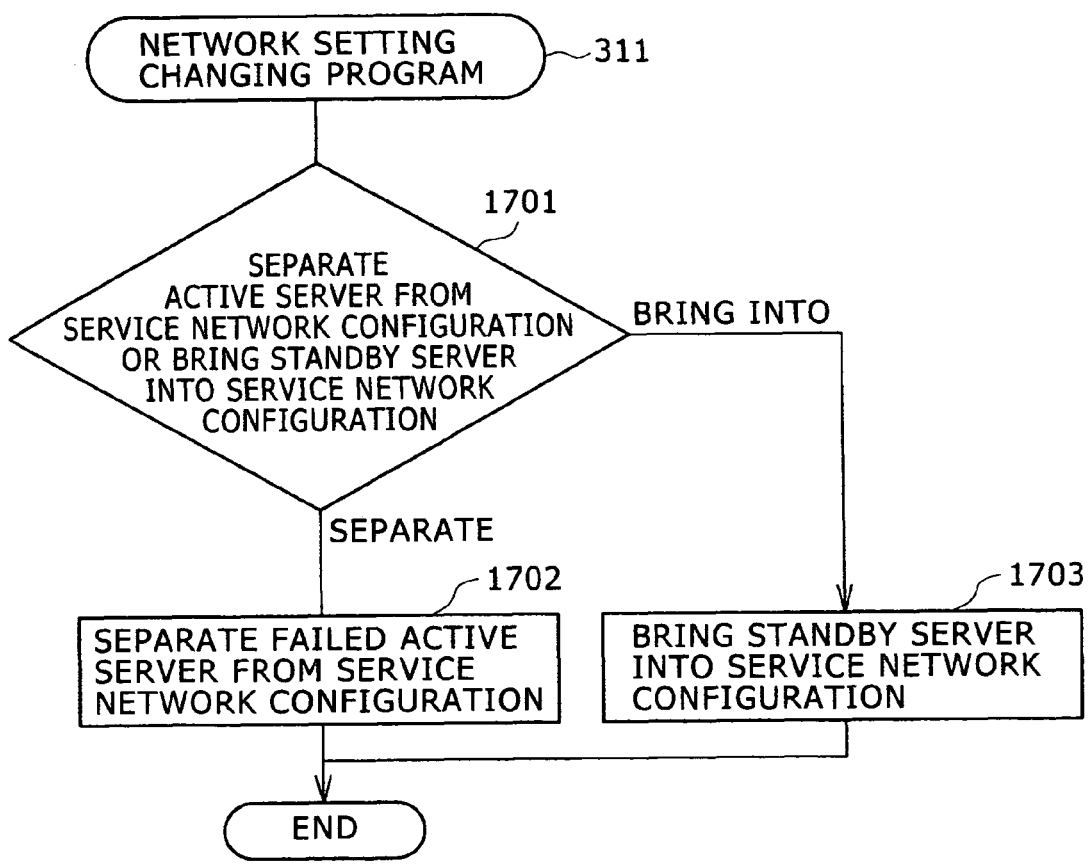
FIG. 17 is a diagram showing the process flow of Network Setting Changing Program used in the first embodiment.

FIG. 17 shows the process flow of Network Setting Changing Program 311 in FIG. 3.

At Step 1701, Network Setting Changing Program decides whether to separate the active server 102 from the service network configuration or bring the standby server 103 into the service network configuration. If the active server is separated, the flow proceeds to Step 1702. If the standby server is brought into the service network configuration, the flow proceeds to Step 1703. At Step 1702, the failed active server is separated from the service network configuration. In this case, the separated active server is brought into a spare network group (See the column 1257 in FIG. 12).

At Step 1703, the standby server 103 is brought into the service network configuration. In this case, the standby server is separated from the spare network group and brought into the network group to which the failed server 102 belonged (See FIG. 12).

Figure 18A:
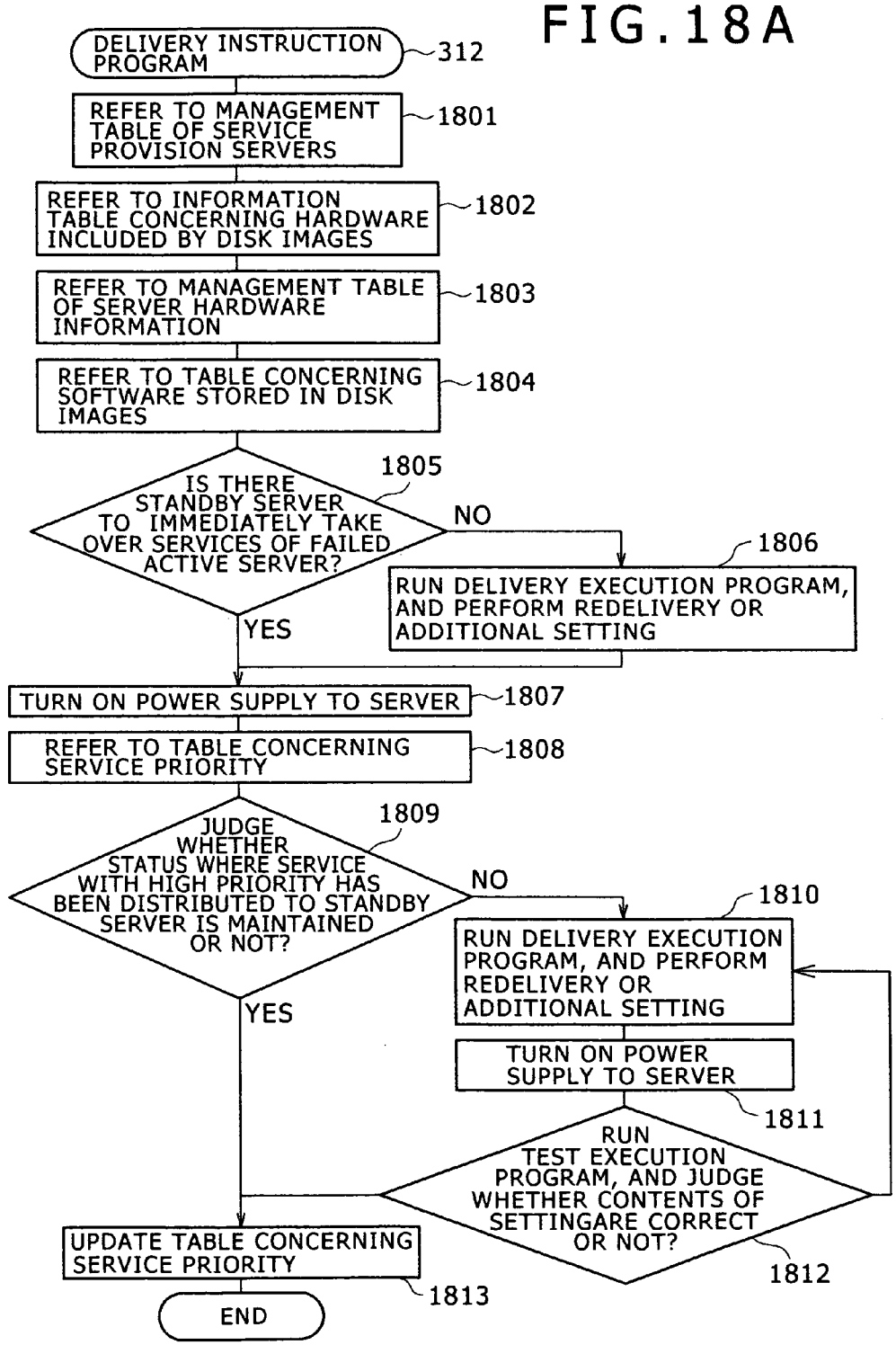
FIG. 18A is a diagram showing the process flow of Delivery Instruction Program used in the first embodiment.

FIG. 18A shows the process flow of Delivery Instruction Program 312 in FIG. 3. The name of the failed active server is reported as input information.

At Step 1801, Delivery Instruction Program refers to Management Table of Service Provision Servers 324 (See FIG. 9). First, the program refers to the column 907 and check whether there is a standby server in standby state or not. If there is none, the program reports that there is no standby server in standby state, and ends the whole process. If there is a standby server 103 in standby state, the program refers to the column 903 (Service) and check whether there is a standby server with the same disk image delivered as that of the failed active server 102; whether there is a standby server with a disk image for the same service delivered as the failed active server; or whether there is a standby server with a disk image formed on the common basis delivered as the failed active server.

If the same disk image is delivered to the standby server, the flow proceeds from Step 1805 to Step 1807. If a disk image for the same service or one formed on the common basis is delivered to the standby server, the flow proceeds to Step 1803. Then the program collects information concerning necessary settings of unique information and necessary P.P.s, and the flow proceeds from Step 1805 to Step 1806. And now, the details about the judgment at Step 1805 will be described later with reference to FIG. 18B.

In the case other than above mentioned two cases, redelivery or additional installation of P.P.s and the settings of unique information are needed. The program refers to the coincidence conditions in the column 908. In addition, as to standby servers, the program refers to Server ID (the column 901). According to the selected coincidence condition, necessary information is collected at the next step.

At Step 1802, the program refers to Information Table concerning Hardware included by Disk Image 323 (See FIG. 8). The program refers to Information Table concerning Hardware included by Disk Image of the failed active server 102, such as CPU architectures (the column 802), the numbers of HBAs (the column 804), and storage capacities (the column 808), and then refers to hardware information about standby servers. If it is all right that a standby server can provide the specified service regardless of the CPU architecture mounted on the standby server, the CPU architectures (the column 802) of the failed active server and the standby server need not to be the same. If the operation policy is to use the same disk images or to use the same CPU architectures as a result of attaching a high value to the operation performance, the program reports that there is no standby server with the desired CPU architecture and then the program ends the whole process. As to the numbers of HBAs (the column 804), the number of the NICs (the column 808) and the storage capacities (the column 611), there is no problem if the number of HBAs, the number of NICs and the storage capacity of the standby server 103 are larger than those of the active server 102. Although the step where the above mentioned judgment is made is Step 1805, it is necessary for the program to refer to the hardware information of the standby server 103 as the needed information with reference to Management Table of Server Hardware Information 321 (See FIG. 6) at Step 1803.

If it is all right that the service levels of both servers are the same although the CPU architectures of both servers are not the same, the program designates the suited coincidence range (the column 908) in Management Table of Service Provision Server 324 (See FIG. 9). In this case, after referring to the host names (the column 705), the IP information (the column 707), the P.P. unique settings (the column 709) that are listed in Table concerning Software stored in Disk Image 322 (See FIG. 7), the program resets the suited settings to the standby server 103. This resetting is performed at Step 1806.

At Step 1804, the program refers to Table concerning Software stored in Disk Image 322 (See FIG. 7), and refers the software information that the failed active server 102 holds. If the disk image delivered to the standby server 103 coincides with that of the failed active server in terms of the service level, the program refers to the host name (the column), the OS password (the column 706), the IP information (the column 707), and the P.P. unique information (the column 709), and performs the resetting at Step 1802. If the disk image coincides with that of the failed active server in terms of common basis level, it is necessary to set the P.P. unique information (the column 709) after performing the above mentioned resetting and installing necessary P.P.s. When the setup of the standby server 103 is completed so that it can take over the service of the failed active server 102, the flow proceeds to Step 1807.

At Step 1807, the program turns on the power supply to the standby server, and the flow proceeds to Step 1808. At Step 1808, the program refers to Table concerning Service Priority 326 (See FIG. 13).

At Step 1809, the program judges whether the status where the services with high priorities have been delivered to standby servers is maintained or not. If the answer is yes, the flow proceeds to Step 1813, and if the answer is no, the flow proceeds to Step 1810.

At Step 1810, Delivery Execution Program 313 is run, and the standby server 103 is reconfigured by performing the necessary redelivery or resetting.

At Step 1811, the power supply to the reconfigured standby server 103 is turned on. At Step 1812, Test Execution Program 314 is run, and whether the delivery or setting is correctly performed or not is judged by checking the contents of the setting and the operation. If they have been correctly performed, the flow proceeds to Step 1813. If they have not been correctly performed, the flow goes back to Step 1810, and the redelivery or resetting is performed depending on their erroneous states.

At Step 1813, Table concerning Service Priority 326 is updated, and the process ends.

The selection methods of disk images to be delivered in advance will be described in detail below. These are as follows:

Disk images of services with higher priorities are delivered in advance according to the priorities set for services by an administrator.

Disk images of services that have high possibilities of failure are delivered in advance in consideration of the operation records.

Disk images of services that are working in servers that have hardware features (such as architectures, parts, and venders) with high possibilities of failure are delivered in advance in consideration of the operation records.

If the appropriate disk images run short of only the number of licenses for software, other disk images are delivered. The priorities for the disk images that run short of the number of licenses for software are lowered.

If the appropriate disk images run short of only the number of licenses for software, the common disk images are delivered. Disk images constituted by the pieces of software other than the pieces of software that run short of the number of licenses are delivered.

Disk images for services that are overused in consideration of the past load changes and failure histories are delivered in advance.

Disk images of services working in the same hardware as that of the failed server are delivered in advance.

Because it is thinkable that a standby server performing a fail-over against a failure has lower possibility of failure than other active servers, the priority of the server that has the same disk image as the standby server performing the fail-over is lowered.

Disk images of servers or services for which predictors such as notifications of memory errors or hard disk errors are detected are delivered in advance although these errors do not directly lead to failures.

Disk images of services working in servers that consume much electric power, exceed the threshold or are expected to exceed the threshold are delivered in advance to standby servers with less electric power consumption prepared beforehand.

The frequencies-of updating disk images delivered in advance are as follows:

Periodic updating

More frequent updating during busy seasons

The chances when disk images are updated are as follows:

When a standby server is used to take fail-over measures.

When the failures of hardware or bugs of software are detected in standby servers on the operation tests and the like.

When the notification of exceeding the threshold values of operation times and the like is issued.

When the notification of exceeding the threshold values of load changes is issued.

When systems are updated.

Figure 18B:
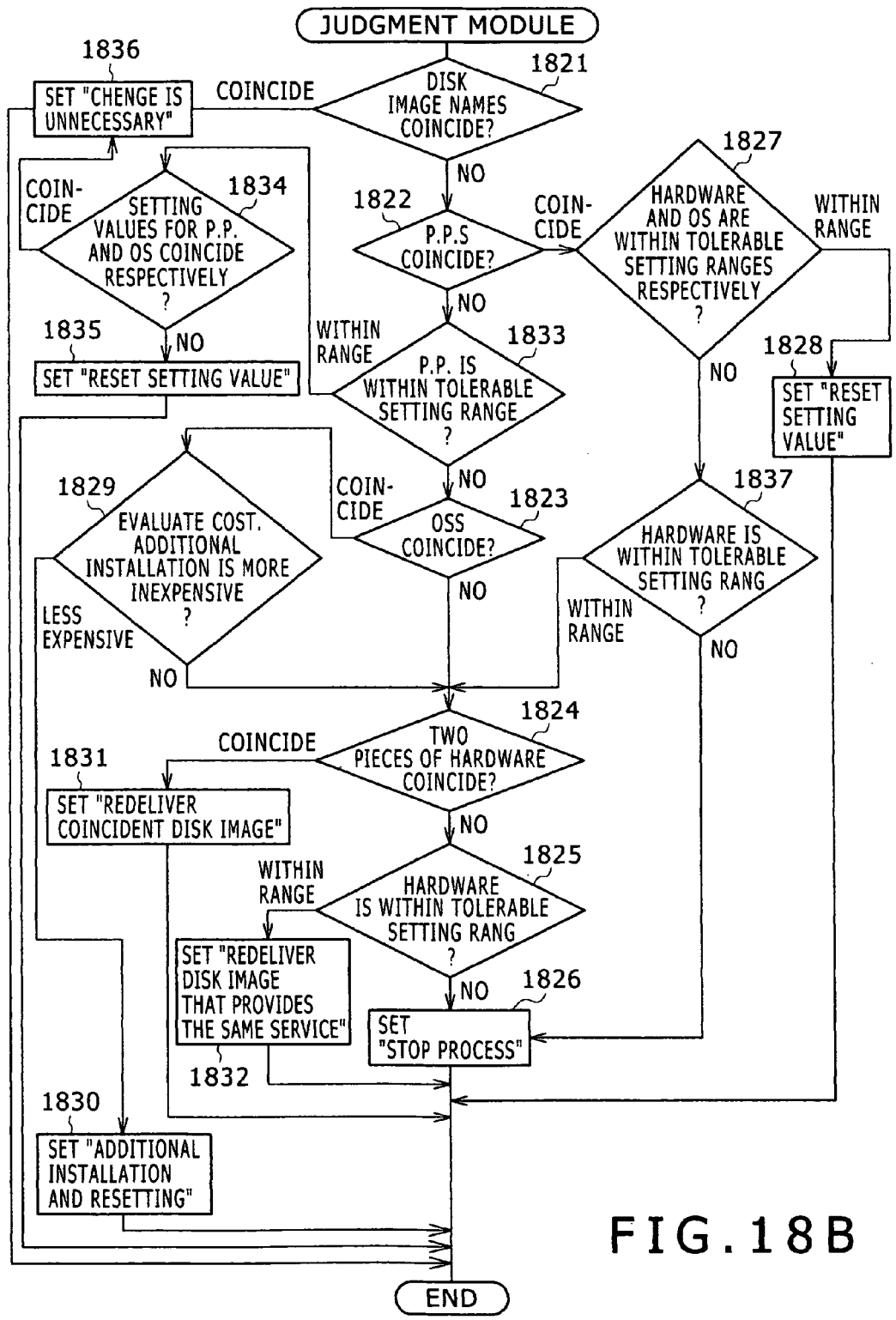
FIG. 18B is a diagram showing the process flow of Delivery Instruction Program used in the first embodiment.

Next, the judgment process (of Judgment Module) where whether there is a standby server to immediately take over the service of the failed active server or not is judged at Step 1805 will be described in detail with reference to FIG. 18B.

First, At Step 1821, whether the name of the disk image delivered to the failed active server 102 and that delivered to the standby server 103 coincide is judged. If they coincide, the flow proceeds to Step 1836, where 'Change is unnecessary" is set and the process ends. If two names do not coincide, the flow proceeds to Step 1822.

At Step 1822, whether the P.P.s delivered to and stored in the standby server 103 and the P.P.s used by the service provided by the failed active server 102 coincide or not is judged. If they coincide, the flow proceeds to Step 1827. If they do not coincide, the flow proceeds to Step 1833.

At Step 1827, whether the hardware and OS of the standby server are within their tolerable setting ranges respectively is judged. If they are within the tolerable ranges respectively, the flow proceeds to Step 1828. If they are not within the tolerable ranges, the flow proceeds to Step 1837.

At Step 1837, whether the hardware of the standby server is within its tolerable setting range or not is judged. If it is within the tolerable range, the flow proceeds to Step 1824. If it is not within the tolerable range, the flow proceeds to Step 1826 and "Stop Process" is set. The setting of "Stop Process" indicates that it is impossible to take fail-over measures. In other words, no standby server 103 that satisfies the requirements can be prepared. In this case, if the management server 101 informs users of the impossibility of taking fail-over measures as well as its reason using such facilities as a GUI display, an e-mail service, or a pager, users can prepare the necessary hardware and software including licenses. Therefore the recovery work can be quickly performed.

At Step 1833, whether P.P.s delivered to the standby server 103 are within their tolerable setting ranges or not is judged. If they are within their tolerable ranges respectively, the flow proceeds to Step 1834. If they are not within their tolerable ranges respectively, the flow proceeds to Step 1823.

At Step 1834, whether the setting values for the P.P.s and OS delivered to the standby server 103 coincide with those for the failed active server 102 or not is judged. In this case, the setting values indicate Host names, IP addresses, license keys and the like. If the former values coincide with the latter values respectively, the flow proceeds to Step 1836. Then "Change is unnecessary" is set and the process ends. If the former values do not coincide with the latter values, the flow proceeds to Step 1835. Then "Reset Setting Values" is set and the process ends.

At Step 1823, whether the OS delivered to the standby server 103 is the same as that delivered to the failed active server 102 or not is judged. If they coincide, the flow proceeds to Step 1829. If they do not coincide, the flow proceeds to Step 1824.

At Step 1829, the cost is evaluated. The cost indicates the time and work required to reset setting values for an OS and the time to install or set necessary P.P.s. In this embodiment, the time required will be especially described. As to the time required to reset setting values for an OS and the time to additionally install or set P.P.s, their values are stored in the column 709 in FIG. 7. The necessary cost calculated is compared with "necessary cost to redeliver a whole disk image" stored in the column 711. In order to achieve a high speed fail-over that is a primary object of the present invention, it is important to select a more inexpensive method.

If the additional installation is more inexpensive, the flow proceeds to 1830. Then "Additional Installation and Resetting" is set, and the process ends. If the additional installation is not more inexpensive, the flow proceeds to 1824.

At Step 1824, whether hardware information of the standby server 103 and that of the failed active server 102 coincide or not is judged. It is necessary to compare not only the CPU architectures and the memory capacities of both servers but also the numbers and types of the I/O devices of both servers. If both coincide perfectly, the flow proceeds to Step 1831. Then "Redeliver Coincident Disk Image" is set, and the process ends. If both do not coincide, the flow proceeds to Step 1825.

At Step 1825, whether the hardware configuration of the standby server 102 is within its tolerable range or not is judged.

If it is within the range, the flow proceeds to Step 1832. Then "Redeliver Disk Image that provides the Same Service" is set, and the process ends. The difference between the disk image redelivered at Step 1831 and that redelivered at Step 1832 is as follows:

The disk image that is redelivered with the setting values set at Step 1831 is the same disk image as is used in the failed active server 102.

On the other hand, the disk image that is redelivered with the setting values set at Step 1832 may be a disk image that can provide the same service as the failed active server 102 although it has a different CPU architecture because of its different hardware configuration, or may be a disk image that can provide the same service as the failed active server 102 although it has connection devices with different performances.

Figure 19:
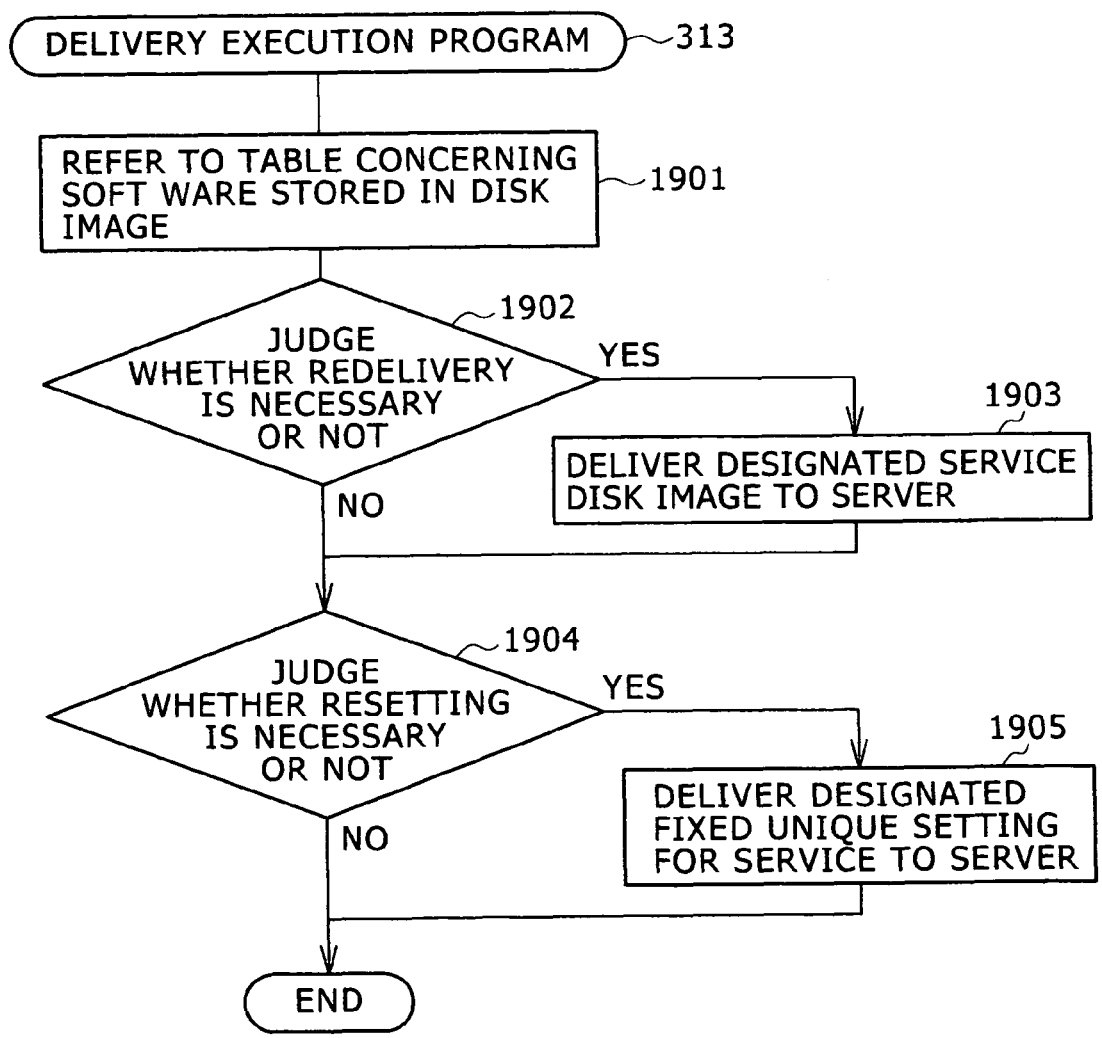
FIG. 19 is a diagram showing the process flow of Delivery Execution Program used in the first embodiment.

FIG. 19 shows the process flow of Delivery Execution Program 313 in FIG. 3. This program executes the delivery or the setting, and its execution is instructed by the preceding program. Inputs to this program are data concerning the designated redelivery or resetting, and data concerning the designated server, service or disk image.

At Step 1901, Delivery Execution Program refers to Table concerning Software stored in Disk Image 322 (See FIG. 7), and obtains the necessary values for the delivery and the setting.

At Step 1902, whether the redelivery is necessary or not is judged. If the redelivery is necessary, the flow proceeds to Step 1903 and if the redelivery is not necessary, the flow proceeds to Step 1904.

At Step 1903, the disk image of the designated service is delivered to the standby server 103, and the flow proceeds to Step 1904.

At Step 1904, whether the resetting is necessary or not is judged. If the resetting is necessary, the flow proceeds to Step 1905 and if the resetting is not necessary, the process ends. At Step 1905, the unique information is reset. If additional installation of P.P.s is necessary, the unique information is reset after the additional installation is performed. After this step is completed, the process ends.

Figure 20:
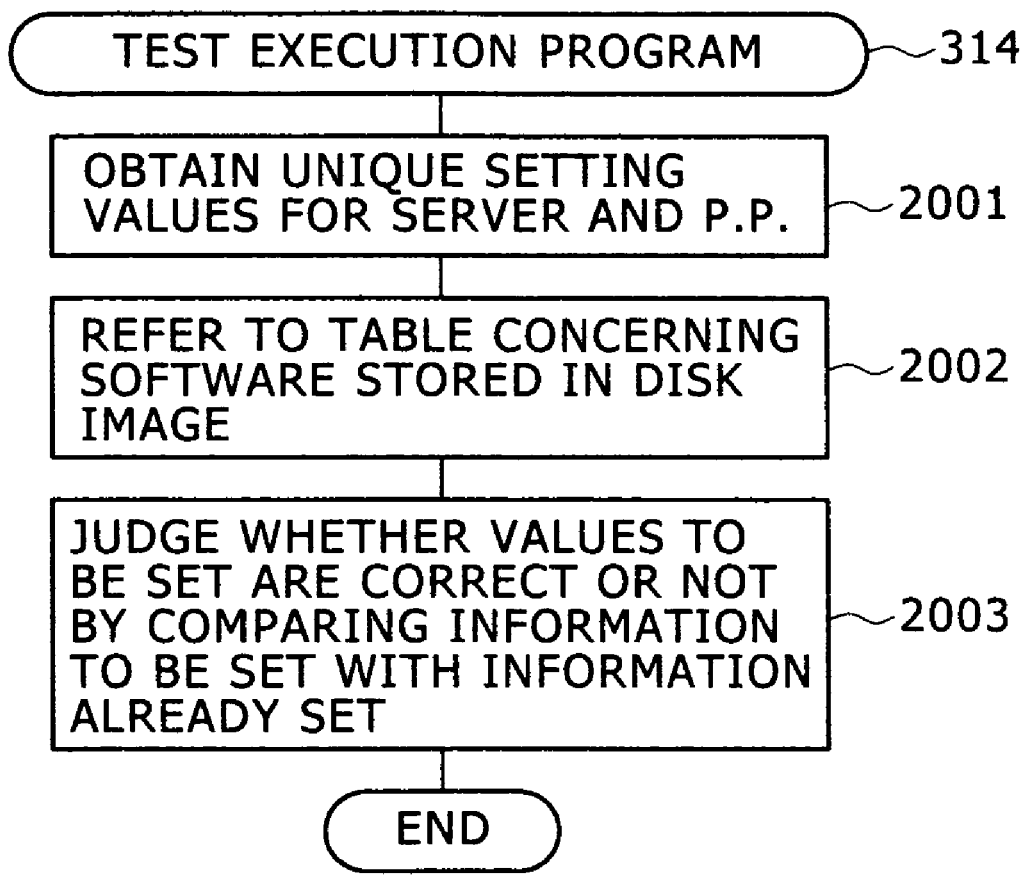
FIG. 20 is a diagram showing the process flow of Test Execution Program used in the first embodiment.

FIG. 20 shows the process flow of Test Execution Program 314 in FIG. 3.

A primary object of this program is to check whether unique settings have proper setting values or to check whether operations are properly performed. In this embodiment, the function of this program to check whether setting values are correct or not will be described in detail.

At Step 2001, the program obtains the setting values of unique information for the server and the P.P.s. There are some methods to obtain these values such as one to obtain information by running an agent program on the OS of the server or another to obtain information using CIM (Common Information Model) and the like. Any method is all right as long as it can obtain necessary information.

At Step 2002, the program refers to Table concerning Software stored in Disk Image 322 (See FIG. 7).

At Step 2003, the program judges whether the setting values of unique information for the server and the P.P.s are correct or not after comparing the values obtained at Step 2001 with the values referred to at Step 2002. Then the process ends.

As to the process flow of Test Execution Program, it gives input data corresponding to a service to a server, and makes the server perform normal operations. Then the program examines the process logs and output results of the server to judge whether the server can output correct results after its normal operation.

Test Execution Program is used to evaluate the operation of a standby server before the standby server is brought into a service network or after the delivery or setting to the standby server is completed. Therefore, the situation where the standby server to which fail-over measures are taken does not work properly, so that the business continuity is adversely affected can be avoided.

As one of the advantages of the present invention, fail-over measures can be taken using not only a standby server in cold-standby state but also using one in hot-standby state. Therefore, a much more high speed fail-over can be realized using a standby server in hot-standby state when it is compared with the conventional method where a disk image is delivered after a failure occurs. The delivery of disk images in advance and the flexible configuration of standby servers according to the circumstances realize the above mentioned high speed fail-over.

In addition, in this embodiment described in detail as above, if a disk image in which unique information is not stored is shared by n servers, the storage capacity necessary to store disk images can be reduced nearly n times when it is compared with the situation where one disk image per server is prepared. In this case, data for the disk image is setting information. The storage capacity for additional setting information is required. Because the setting information for n servers needs a very small capacity (from several bytes to several kilobytes), the sharing of a disk image (from several gigabytes to tens of gigabytes) has a large beneficial effect even if the storage capacity for additional setting information is necessary. To be concrete, when a hundred servers that provide the same service are working as so many active servers, if one server has a disk image of ten gigabytes with fixed setting values, the storage capacity of a thousand gigabytes (a terabytes) is required. If a disk image is shared by the hundred servers, only the storage capacity of ten gigabytes is required, with the result that 99% of the storage capacity can be reduced.

In addition, if the shared disk image is delivered in advance to a standby server, many active servers can select the standby server as its fail-over destination. If a type of setting values are set in advance to a standby server, the standby server can be selected as a fail-over destination by only one active server when the fixed setting values are not changed. However, if the setting values for unique information are set or changed when a failure occurs, the standby server can be selected as a fail-over destination by multiple active servers. For example, it will be assumed that the setting values for an active server with a high priority is set to a spare sever in advance. If another server (with the same service) fails, it will take only several tens of seconds by changing the setting values of the standby server to take a fail-over measures for the failed server, while it will take several tens of minutes by redelivering an appropriate disk image. If the time required to redeliver the disk image is 30 minutes and the time required to reset the setting values is 60 seconds. Time required by the fail-over is reduced 60 times.

In the case where there are multiple active servers, if the number of failed active servers exceeds the number of standby servers, the active servers and the services to be saved can be selected according to their priorities. In a similar way as above, if there are multiple standby servers, more appropriate standby server should be selected. If there is a standby server that has the same disk image included in the failed active server, this server should be selected.

In a special case where there are multiple standby servers that meet the above condition, a standby server to be used should be selected according to Table concerning Service Priority where parameters showing the priorities of services are listed. Designating tolerable ranges as to the performances of standby servers can prevent a standby server with a needlessly higher performance from being required. Consequently, even if an active server that needs a higher performance fails, there is a higher possibility that the standby servers with that performance are available. In addition, because the redelivery necessary to give over a high performance standby server can be prevented, the occurrence of a situation where other servers are stopped and the redelivery is performed can be effectively avoided. In addition, the situation of standby servers can be reflected on the priority to select standby servers. For example, the running policy of "No continuous running" can be adopted based on the operational records of servers. In contrast with this, the running policy of "Running specific servers in a focused way" can be also adopted under the assumption that "a server that runs continuously is reliable". In addition, according to the running policy of "No running both of adjacent standby servers as much as possible, that is, running the farthest server", it becomes possible that heat produced by servers is dispersed or that servers are run up to the limit of their power supplies by preventing power from being consumed locally. After evaluating the priorities of two servers, if they are the same, either server can be selected. For example, selecting the server with a smaller serial number is one of the selection methods. As mentioned above, some control methods where attention is paid to the location of servers, power consumed by servers and heat produced by servers is also available.

IF there are no servers that satisfy the above conditions, the condition satisfied by any of the servers is searched for. For example, after the costs of all the servers are calculated, the server with the lowest cost is extracted. In other words, the standby server that is the most inexpensive to prepare is selected, while whether the redelivery is necessary or not is judged. In some cases, the fail-over measures is interrupted, and the management server performs the user notification process by informing users of the impossibility of taking fail-over measures and recording data on the logs.

The Second Embodiment of the Present Invention

Figure 21:
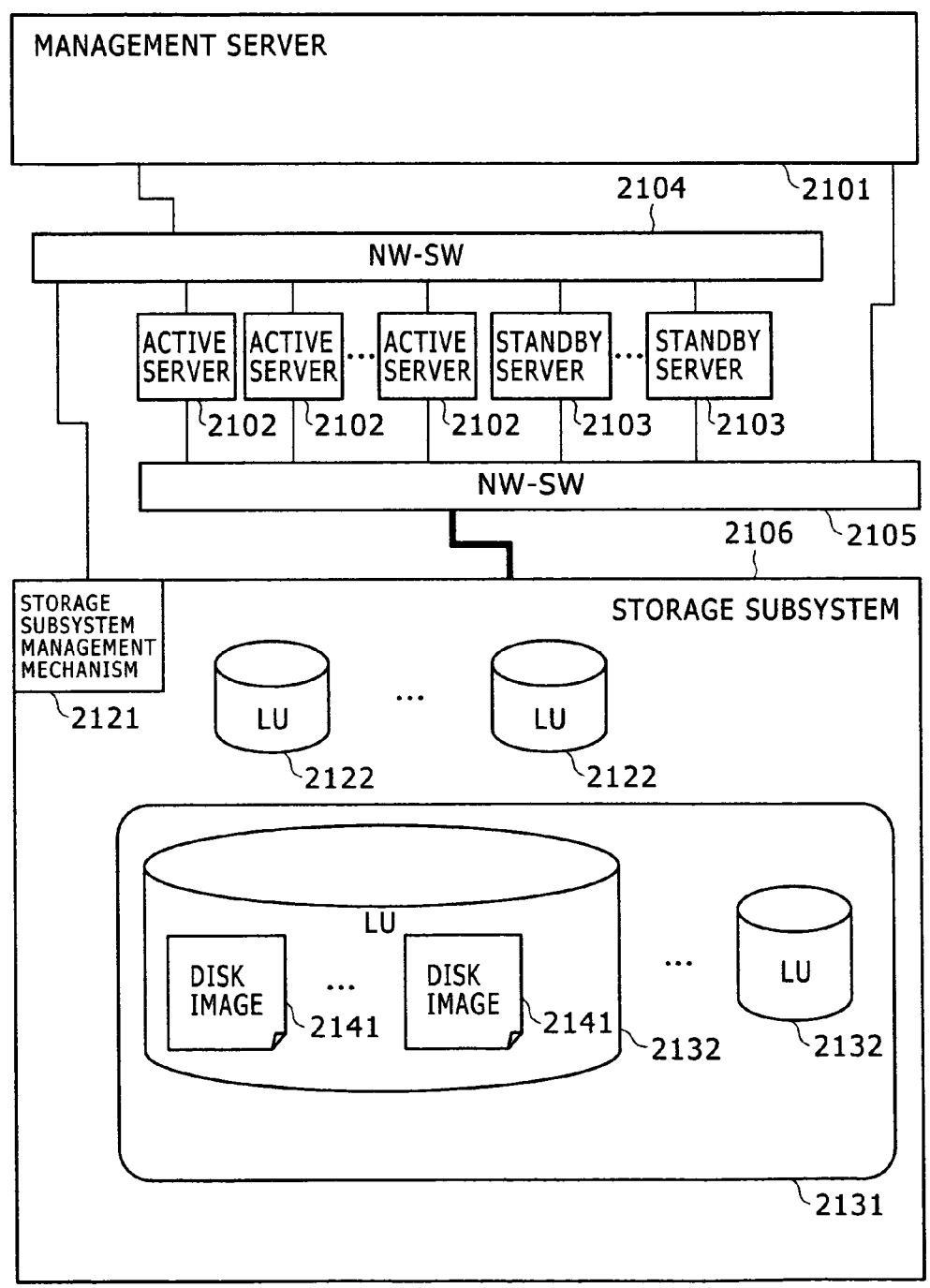
FIG. 21 is a schematic block diagram showing a system of the second embodiment of the present invention.

FIG. 21 is a schematic block diagram showing a system of the second embodiment of the present invention. The difference between the first embodiment and the second embodiment is that the storage device of the second embodiment is a storage subsystem 2106 attached to a SAN instead of integrated hard disks. The storage subsystem 2106 is connected to servers (2101, 2102, and 2103) via a NW-SW 2105. Storage Subsystem Management Mechanism 2121 that controls the storage subsystem and a management server 2101 are also connected via a NW-SW 2104.

The management server 2101 connects to active servers 2102 and standby servers 2103 via the NW-SW 2104. The active servers 2102 provide service services and when one of the active servers 2102 breaks down, one of the standby servers 2103 will provide the service services instead of the failed active server. The management server 2101 keeps an eye on the active servers 2102 and the standby servers 2103. A primary object of this embodiment is to provide a system, wherein a failure notification issued by any one of the active servers 2102 is monitored and when one of the active servers 2102 breaks down, one of the standby servers 2103 will provide the service services instead of the failed active server, with the result that the continuity of business can be enhanced.

Boot disks to boot the active servers 2102 and standby servers 2103 are LUs (Logical Units) 2122 in the storage subsystem 2106, and OSs, middleware and applications to provide services are installed on the LUs 2122. The management server 2101 is connected to the storage subsystem 2106, and disk images 2141 where software necessary to provide service services is installed are stored in the LUs 2132. Especially, an aggregation of the LUs 2132 where the disk images 2141 are stored is termed LU Group 2131.

Just like those of the preceding embodiment, the contents of the disk images 2141 are the disk images of the individual active servers necessary to provide the service services, disk images with the unique information (setting values) about the individual active servers removed, or disk images where only the pieces of software used commonly by the active servers are installed, and the like. When a failure occurs at any of the active servers 2102, a disk image 2141 that provides a similar service as the failed active server 2102 does is delivered to one of the standby servers 2103, with the result that the continuity of the service can be achieved. As to the disk image delivered, if the disk image 2141 that has the completely same disk image of the failed server 2102 is delivered, the continuity of the service can be achieved only by the delivery. In this case, however, the same number of the disk images 2141 as the number of the active servers must be prepared, with the result that an enormous amount of storage is needed.

Compared with the above approach, if the disk images with the unique information about the individual active servers removed are used, the disk images 2141 with the same service services can be commonly used although the setting the unique information about the individual active servers must be performed after delivery. Hence, the storage capacity necessary to store the disk images 2141 can be reduced. In addition, if the disk images 2141 where only the pieces of software used commonly by the active servers are installed are used, the disk images 2141 can be shared throughout the server system. In this case, because the necessary pieces of software must be installed and the unique information for OS and each piece of software must be set after delivery, the highest speed of the fail-over cannot be expected. However, this approach is much more advantageous in terms of workload and labor time than approaches where installation must be performed on a server which has nothing installed. Especially in this embodiment, because the time needed to complete a fail-over can be reduced by delivering disk images in advance to the standby servers 2103, reinstallation should be avoided as much as possible. By delivering the disk images 2141, where only the pieces of software used commonly are installed, in advance on the standby servers, reinstallation can be avoided and a fail-over can be realized more speedy.

Control Program Group 110 includes a group of programs that realize the above mentioned high speed fail-over. In addition, Management Table Group 111 stores information tables concerning the active servers 2102 and the standby servers 2103, information tables concerning the disk images 2141, and information table concerning service services. Here, because the way to deliver disk images is not specified, the disk images can be delivered via an IP network, via a storage network, or they can be delivered with the use of the disk copy function between the LUs in the storage subsystem 2106. In addition, the case where the management server 2101 has integrated disks and stores the disk images 2141 on the integrated disks can be considered as one of the variations of this embodiment. Therefore, there are some cases where the management server 2101 and the storage subsystem 2106 are not connected to each other via the NW-SW 2105, and further there are cases where integrated disks and a storage subsystem attached to a SAN coexist.

Figure 22:
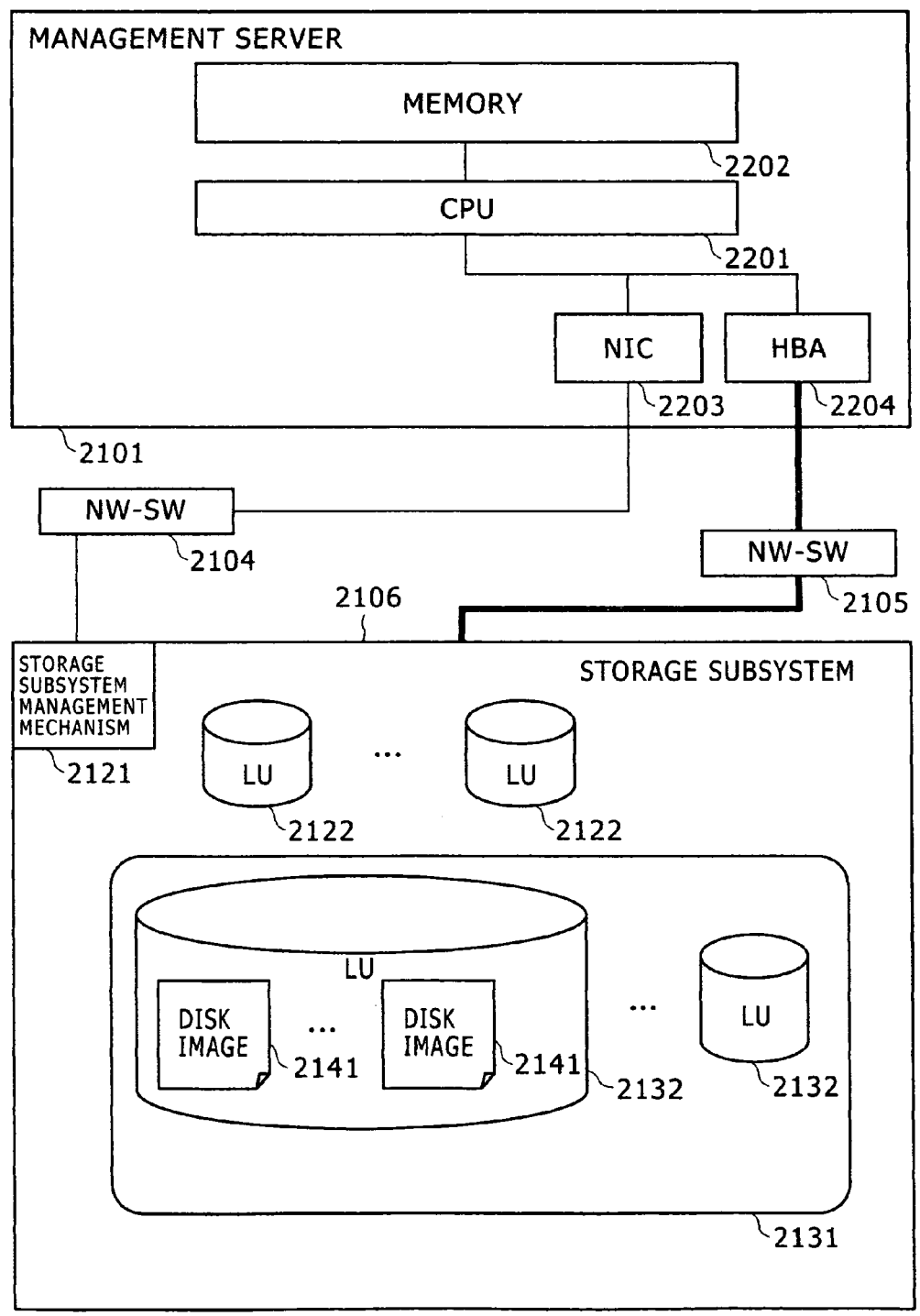
FIG. 22 is a block diagram showing a management server used in the second embodiment.

FIG. 22 is a diagram showing an example of the configuration of the management server 2101 in this embodiment. The management server 2101 includes a CPU 2201 that carries out calculation, a memory 2202 that stores programs and processes used in the CPU 2201, a NIC 2203 that is used for the communication through the IP network, an HBA 2204 that is used for communication with the storage subsystem 2106, and the LUs 2122 (, which exist in the storage subsystem 2106 and are connected to the management server 2101 via the NW-SW 2105 and the HBA,) that are storage areas to store programs and data. Just like the configuration shown in FIG. 3, Control Program Group 110 and Management Table Group 111 are stored in the memory 2202.

In a similar way to the preceding embodiment, Control Program Group 110 (See FIG. 15) includes Failure Notification Receiving Program 310 (See FIG. 16), Network Setting Changing Program 311 (See FIG. 17), Delivery Instruction Program 312 (See FIG. 18), Delivery Execution Program 313 (See FIG. 19), and Test Execution Program 314 (See FIG. 20).

In a similar way to the preceding embodiment, Management Table Group 111 includes Management Table of Server Hardware Information 321 (See FIG. 6), Table concerning Software stored in Disk Image 322 (See FIG. 7), Information Table concerning Hardware included by Disk Image 323 (See FIG. 8), Management Table of Service Provision Server 324 (See FIG. 9, FIG. 10, and FIG. 11), Table concerning Services and Network 325 (See FIG. 12), Table concerning Service Priority 326 (See FIG. 13), Security Setting Table of Storage Subsystem 327 (See FIG. 24), Failure Notification Management Table 328 (FIG. 14), and the like.

Failure notifications received by the management server 2101 are performed by a monitoring mechanism that is built using hardware and software possessed by the active server 2102, that is, the target server for monitoring and the standby server 2103. In addition, it is to be understood that the case where the management server 2101 has integrated disks and the disk images 2141 are stored on the integrated disks are also covered by this embodiment. Therefore, there are some cases where the management server 2101 and the storage subsystem 2106 are not connected to each other via the NW-SW 2105, and further there are cases where integrated disks and a storage subsystem attached to a SAN coexist.

Figure 23:
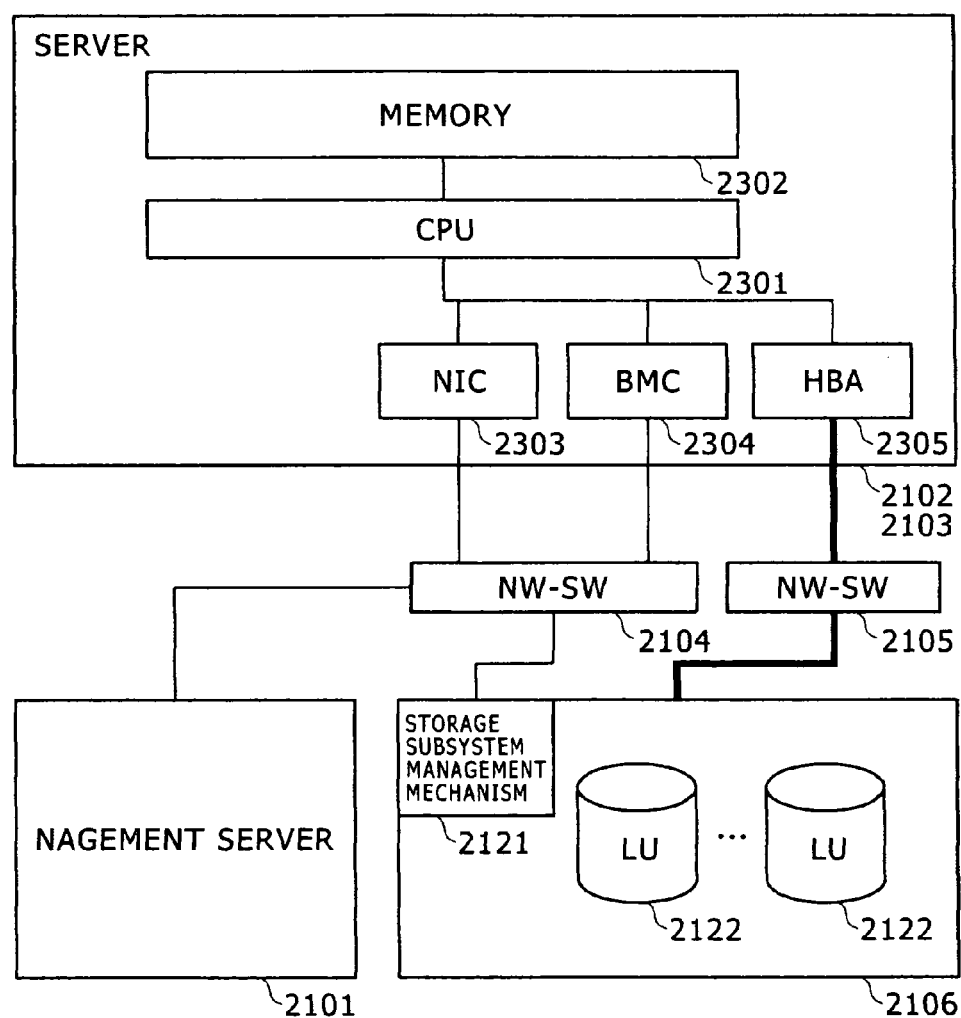
FIG. 23 is a block diagram showing a managed server used in the second embodiment.

FIG. 23 illustrates the configuration of the active server 2102 (or the standby server 2103). The active server 2102 (or the standby server 2103) includes a CPU 2301 that carries out calculation, a memory 2302 that stores programs and processes used by the CPU 2301, a NIC 2303 that is used for the communication through the IP network, a BMC 2304 that is used for the management server 2101 to control power supply and an HBA 2305 used for communication with the storage subsystem. The power to the active server 2102 (or the standby server 2103) can be turned on or off through the BMC 2304.

The active server 2102 and the standby server 2103 are connected to the management server 2101 via the NW-SW 2104. Monitoring programs (not shown) running on the active server 2102 and on the standby server 2103 communicate with the management server 2101 through the NIC 2303, and inform the management server 2101 of failures. The settings, loads, failures and the like of the active server 2102 and the standby server 2103 can be monitored by the above mentioned monitoring programs. There may be often the case where the NIC 2303 is used only for management, so it is common that another NIC is installed for the service services. In addition, the BMC 2304 also connects the active server 2102 and the standby server 2103 to the management server 2101 through the network. Therefore the management server 2101 can be informed of hardware failures and it can also turn on or off the power to the active server 2102 and the standby server 2103 forcibly through hardware means.

Figures 24, 25:
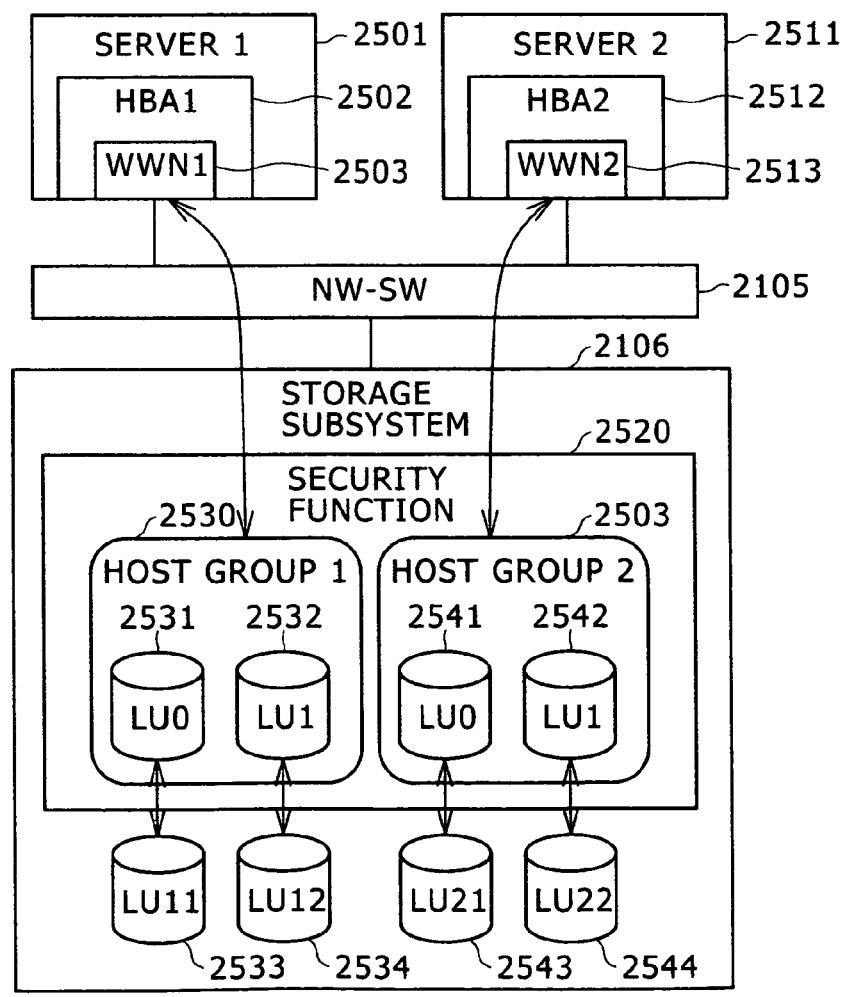
FIG. 24 is a diagram showing Security Setting Table of Storage Subsystem used in the second embodiment.
FIG. 25 is a diagram showing the security setting of a storage used in the second embodiment.

FIG. 24 illustrates Security Setting Table of Storage Subsystem 327 in detail.

The column 2401 stores host group names. The column 2402 stores WWNs. The column 2403 stores logical LU names. The column 2404 stores physical LU names corresponding to logical LU names in the column 2403. The column 2405 stores port numbers of the storage subsystem 2106.

Access by a WWN registered in a host group is allowed only to the LUs registered in the same group. In other words, an LU cannot be accessed by a specific server.

FIG. 25 illustrates the behavior of a security function 2520 that decides the correspondent relations between the LUs 2122 and the management server 2101, the active servers 2102, or the standby servers 2103. A server 1 (2501) possesses an HBA1 (2502), in which WWWN1 (2503) is recorded. A server 2 (2511) possesses an HBA2 (2512), in which WWWN2 (2513) is recorded. The server 1 (2501) and the server 2 (2511) are connected to the NW-SW (network switch) 2105, and they are connected to the storage subsystem 2106 via the NW-SW 2105.

The security function 2520 allows the server 1 (2501) to access a virtual disk LU0 (2531) and LU1 (2532) which correspond to a physical disk LU10 (2533) and LU11 (2534) respectively. On the other hand, the server 2 (2511) can access a virtual disk LU0 (2541) and LU1 (2542) which correspond to a physical disk LU21 (2543) and LU22 (2544) respectively. The server 1 (2501) can access neither the physical disk LU21 (2543) nor LU22 (2544).

The Third Embodiment of the Present Invention

Figure 26:
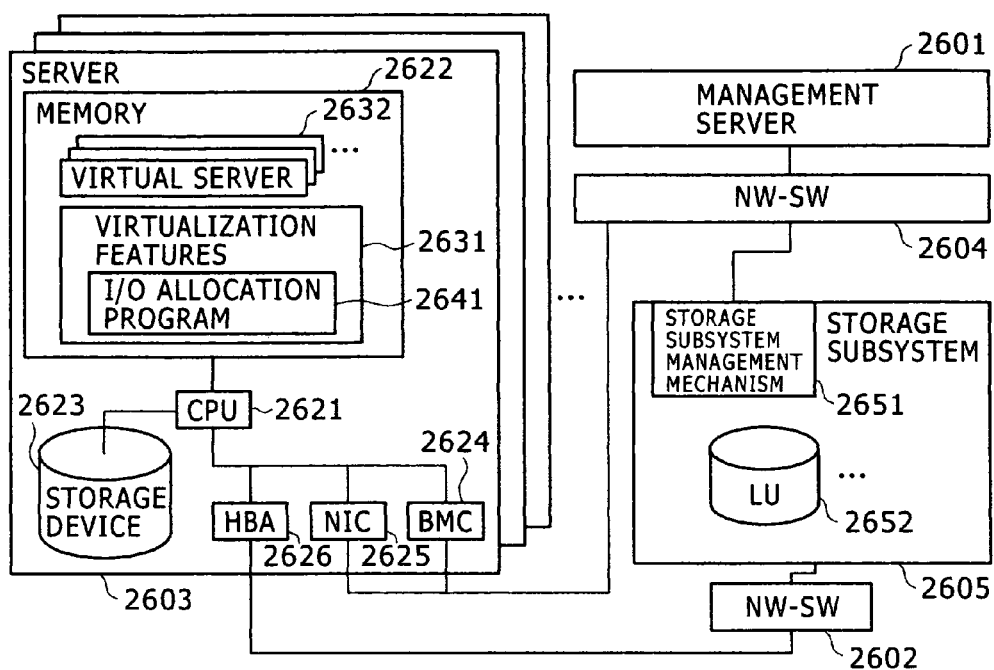
FIG. 26 is a block diagram showing a system including integrated disks and storages attached to a SAN used in the third embodiment.

FIG. 26 is a schematic block diagram showing a system of the third embodiment of the present invention. The difference between the first embodiment and the third embodiment is that the active servers and the standby servers of the third embodiment are virtual servers 2632 that utilize virtualization features 2631 and that I/O allocation programs 2641 in the virtualization features 2631 can store differences on an LU 2652 in a storage subsystem 2605. Owing to the above mentioned configuration of this embodiment, it becomes possible that when one of the active servers fails, a standby server can take over the service of the failed active server with the use of the latest data.

A management server 2601 is connected to a storage subsystem management mechanism 2651 that manages the storage subsystem 2605 via a NW-SW 2604 and also it is connected to servers 2603 via a NW-SW 2604.

The servers 2603 include CPUs 2621 that carry out calculation, memories 2622 that store programs and processes used by the CPUs 2621, NICs 2625 that are used for the communication through an IP network, HBAs 2626 used for communication with the storage subsystem, BMCs 2624 that are used for the management server 2601 to control power supply, and the LUs 2652 (, which exist in the storage subsystem 2605 and are connected to the server 2603 via a NW-SW 2602 and the HBA 2626,) that are storage areas to store programs and data. In addition, storage devices 2623 are attached to the servers as storage areas.

The virtualization features 2631 are working on the memories 2622 to realize server virtualization with the use of which the resources of the servers 2603 (the CPUs, the memories, I/O devices and the like) are shared. The virtualization features 2631 divide the resources of the servers and allocate the divided resources to the virtual servers 2632 individually. I/O allocation programs 2641 in the virtualization features 2631 divide I/O requests from the virtual servers 2632 and write the divided I/O requests into disks for booting the virtual servers 2632 and into difference data disks used to record differences generated after the virtual servers are booted. The disks for booting the virtual servers can be stored in the storage devices 2623 or can be stored in the LUs 2652 in the storage subsystem 2605. On the other hand, the difference data disks must be stored in the LUs 2652 in the storage subsystem 2605, so that servers other than the servers 2603 and the virtual servers 2632 as well as the servers 2603 can access the difference data disks. In other words, the difference data disks must be shared. Consequently, even when one of the servers 2603 or the virtual servers 2632 fails and fail-over measures to deliver a disk image is taken, it becomes possible to take over the service of the failed server with the use of the latest data. FIG. 26 shows an example of the embodiment of the present invention where integrated disks and a storage subsystem attached to a SAN coexist.

Figure 27:
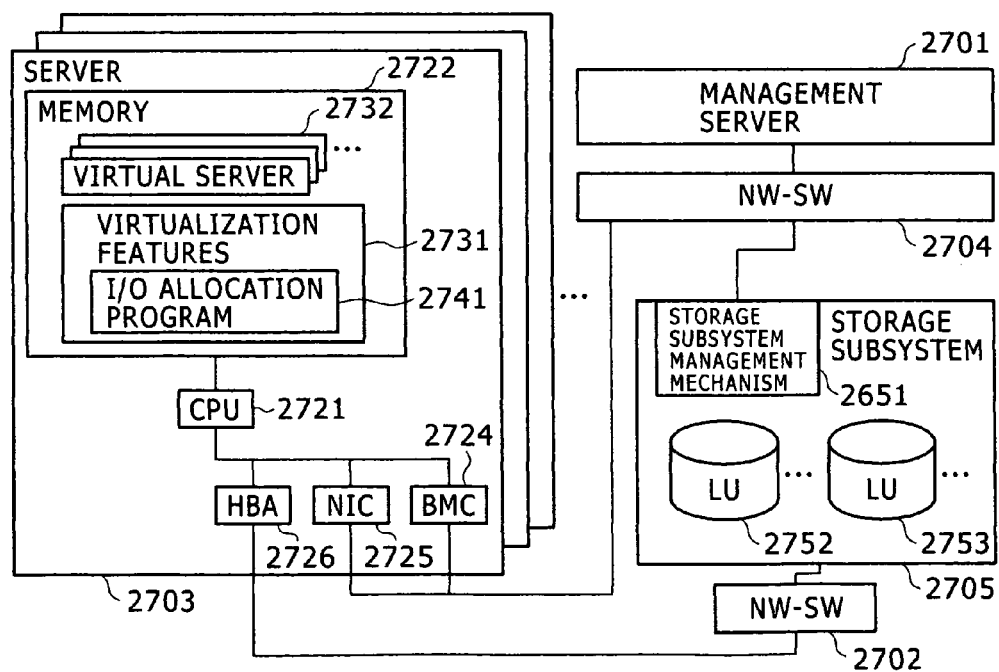
FIG. 27 is a block diagram showing a system including only storages attached to a SAN used in the third embodiment.

FIG. 27 shows one of variations of the third embodiment where there are no storage devices corresponding to the storage disks 2623 shown in FIG. 26 and the disks for booting the virtual servers are stored in LUs 2753 in a storage subsystem 2705. Other parts of FIG. 26 are similar to those of FIG. 27. The component 270* in FIG. 27 is corresponding to the component 260* in FIG. 26. In this case, the disks for booting the virtual servers can be taken over when failures occur. However, if an OS or any piece of software fails, an appropriate disk image must be sent to the corresponding disk for booting the virtual servers in order to recover them.

Figure 28:
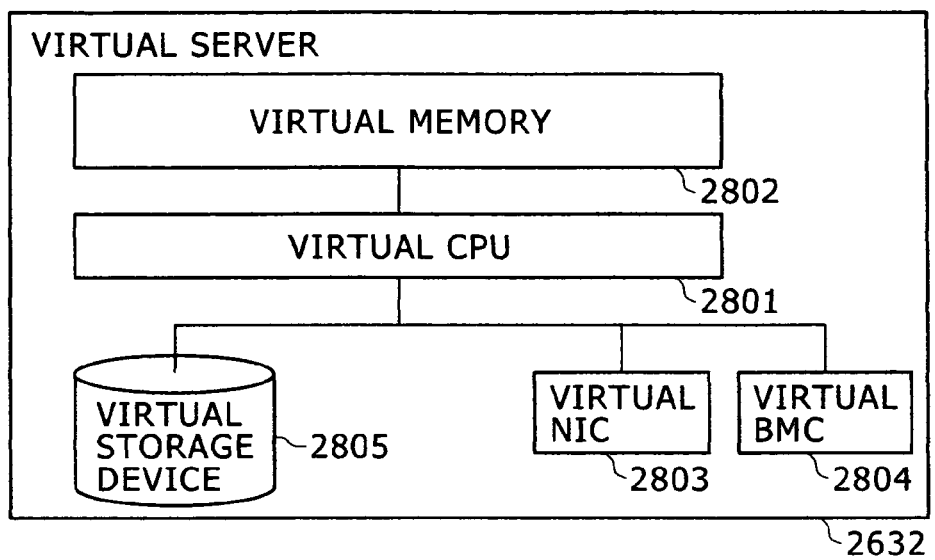
FIG. 28 is a diagram showing a virtual server shown in FIG. 26 used in the third embodiment.

FIG. 28 illustrates the configuration of one of the virtual servers 2632 shown in FIG. 26 in detail. The virtual server 2632 includes a virtual CPU 2801 that carries out calculation, a virtual memory 2802 that stores programs and processes used in the CPU 2801, a virtual NIC 2803 that is used for the communication through the IP network, a virtual BMC 2804 that is used for the management server 2601 to control power supply, and a virtual storage device 2805.

Figure 29:
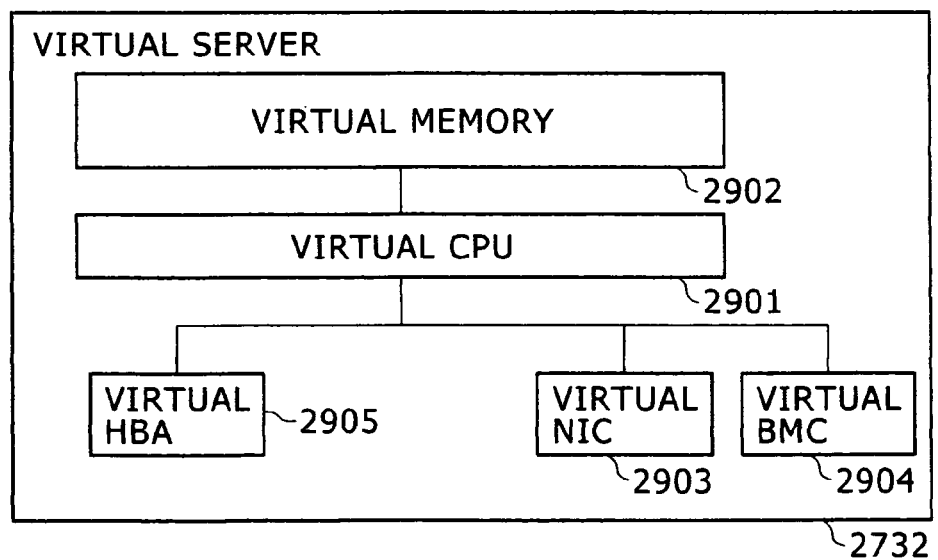
FIG. 29 is a diagram showing a virtual server shown in FIG. 27 used in the third embodiment.

FIG. 29 illustrates the configuration of one of the virtual servers 2732 shown in FIG. 27 in detail. The difference from FIG. 28 is that there is a connection device used for the virtual server to connect to storages in FIG. 29. In FIG. 29, there is a virtual HBA 2905 used for the virtual server to connect to the storage subsystem 2705 instead of the virtual storage device 2805 in FIG. 28.

The virtual server 2732 includes a virtual CPU 2901 that carries out calculation, a virtual memory 2902 that stores programs and processes used in the CPU 2901, a virtual NIC 2903 that is used for the communication through the IP network, a virtual HBA 2995 that is used for communication with the storage subsystem, and a virtual BMC 2904 that is used for the management server 2601 to control power supply.

FIG. 30 illustrates Difference Data Management Table used in this embodiment in detail.

The column 3001 stores server identifiers. The column 3002 stores virtual server identifiers.

The column 3003 stores original volume names. The original volumes may be disks for booting OSs or may be disks for storing data. Whether an original volume is a disk for booting an OS or a disk for storing data can be judged by the corresponding type stored in the column 3005.

The column 3004 stores difference volume names. In the configuration of this embodiment, when fail-over measures are taken against a failure, it is possible to restart the service with the use of the latest data by taking over this difference volume of the failed server.

FIG. 31 illustrates License Management Table 330 shown in FIG. 3 in detail.

The column 3101 stores license product names. The column 3102 stores the remaining numbers of licenses.

There are many license agreements where it is impossible to deliver disk images that include the pieces of software with the remaining numbers of their licenses 0 to standby servers in advance. By managing the remaining numbers of licenses, the situation where there are disk images that include the pieces of software with the remaining numbers of their licenses 0 can be known. Therefore, when such a situation occurs, the priorities (the column 1303) in Table concerning Service Priority 326 must be updated.

Although the present invention has been described in detail based on its various embodiments, it is to be understood that the case where the connection method to attach a storage subsystem to a SAN is an iSCSI is also applicable to the present invention.

What is claimed is:

1. A server switching method for a server system that includes active servers, at least one standby server and a management server that are equipped with storage devices and process modules respectively and that are all connected through a network, the method comprising:
the management server:
delivering a disk image of an appropriate active server to the standby server in advance;
holding service provision management server information in a storage device of its own;
when receiving the report that the active server has failed, judging whether or not it is possible for the standby server to perform the service of the failed active server based on the service provision management server information held in the storage device; and
instructing the standby server to perform the service of the active server, if possible, wherein:
the management server judges whether or not it is possible for the standby server to perform the service of the failed active server based on disk image names that are included in the service provision management server information,
the management server holds software management information possessed by the disk image in the storage device of its own, and judges whether or not the disk image stored in advance in the storage device of the standby server lacks any pieces of software based on both the service provision management server information and the software management information, and
if the disk image stored in advance in the storage device of the standby server lacks some pieces of software, the management server:
compares the time needed to install the lacking pieces of software with the time needed to deliver the disk image;
installs the lacking pieces of software on the standby server and changes the setting values of the software if the time needed to install the lacking pieces of software on the standby server is shorter; and
delivers the disk image to the standby server if the time needed to deliver the disk image to the standby server is shorter.

2. A server switching method for a server system that includes active servers, at least one standby server and a management server that are equipped with storage devices and process modules respectively and that are all connected through a network, the method comprising:
the management server:
delivering a disk image of an appropriate active server to the standby server in advance;
holding service provision management server information in a storage device of its own;
when receiving the report that the active server has failed, judging whether or not it is possible for the standby server to perform the service of the failed active server based on the service provision management server information held in the storage device; and
instructing the standby server to perform the service of the active server, if possible, wherein:
if the management server judges the standby server to be incapable of performing the service of the failed active server, the management server sends, to the standby server, a disk image with the use of which the standby server can perform the service of the active server, and
the management server:
holds hardware management information in the storage device of its own;
judges whether the type of the process module of the active server and that of the standby server coincide or not based on the hardware management information when the management server sends the disk image to the standby server; and
if they do not coincide, delivers a disk image that is fit to the type of the process module of the standby server.

3. A server system comprising:
an active server;
at least one standby server; and
a management server that are connected through a network to the active server and the standby server, wherein:
the active server, the standby server, and the management server are equipped with process modules and storage devices respectively,
the process module of the management server stores the disk image of the active server in advance in the storage device of the standby server and holds service provision management server information in the storage device of the management server,
when the management server receives the report that the active server has failed, the process module of the management server judges whether or not it is possible for the standby server to perform the service of the failed active server based on the service provision management server information,
the process module instructs the standby server to perform the service of the active server, if possible,
the process module of the management server judges whether or not it is possible for the standby server to perform the service of the failed active server based on disk image names that are included in the service provision management server information,
the management server holds software management information possessed by the disk image in the storage device of its own,
the process module of the management server judges whether the disk image stored in advance in the storage device of the standby server lacks some pieces of software or not based on both the service provision management server information and the software management information and if the disk image stored in advance in the storage device lacks any pieces of software, and the process module:
- compares the time needed to install the lacking pieces of software with the time to deliver another disk image;
- installs the lacking pieces of software on the standby server and changes the setting values of the software if the time needed to install the lacking pieces of software on the standby server is shorter; and
- delivers the disk image to the standby server if the time to deliver the disk image to the standby server is shorter.

* * * * *